US006529901B1

(12) United States Patent
Chaudhuri et al.

(10) Patent No.: US 6,529,901 B1
(45) Date of Patent: Mar. 4, 2003

(54) AUTOMATING STATISTICS MANAGEMENT FOR QUERY OPTIMIZERS

(75) Inventors: Surajit Chaudhuri, Redmond, WA (US); Vivek Narasayya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/513,833

(22) Filed: Feb. 25, 2000

Related U.S. Application Data

(63) Continuation-in-part of application No. 09/342,988, filed on Jun. 29, 1999, now Pat. No. 6,363,371.

(51) Int. Cl.⁷ .............................................. G06F 17/30
(52) U.S. Cl. ........................................ 707/3; 707/102
(58) Field of Search ............................ 707/1, 2, 3, 102, 707/201

(56) References Cited

U.S. PATENT DOCUMENTS

| 5,875,445 | A | * | 2/1999 | Antonshenkov | ............... | 707/2 |
| 6,108,647 | A | * | 8/2000 | Poosala et al. | ................ | 707/1 |
| 6,356,889 | B1 | * | 3/2002 | Lohman et al. | ................ | 707/2 |
| 6,363,371 | B1 | * | 3/2002 | Chaudhuri et al. | ............ | 707/2 |

OTHER PUBLICATIONS

Choenni S., Blanken H., Chang T., "Index Selection in Relational Databases", Proc. 5th IEEE ICCI 1993.
Chaundhuri, S., Motwani R., Narasayya V., "Random Sampling For Histogram Construction: How much is enough?" Proceedings of the ACM SIGMOD International Conference on Management of Data, 1988.
Chaundhuri S., Marasayya V., "An Efficient. Cost–Driven Index Selection Tool for Miscrosoft SQL Server." Proceedings of the 23rd VLDB Conference Athens, Greece, 1997.
Frank M., Omiecinski E., Navathe S., "Adaptive and Automated Index Selection in RDBMS", EDBT 92.
Finkelstein S., Schkolnick M., Tiberio P., "Physical Database Design for Relational Databases", ACM TODS, Mar. 1988.
Gibbons P.B., Matias Y., Poosala V., "Fast Incremental Maintenance of Approximate Histograms." Proceedings of the 23rd VLDB Conference, Athens, Greece, 1997, pp. 466–475.

(List continued on next page.)

Primary Examiner—Diane D. Mizrahi
(74) Attorney, Agent, or Firm—Watts, Hoffmann, Fisher & Heinke, Co., LPA

(57) ABSTRACT

In a database system, a method for determining a set of essential statistics. A set of potentially relevant, but unconstructed, statistics for a user query comprising a plurality of operators is compiled. A first value is assigned to the unconstructed statistics and a first projected query cost is computed for the query wherein the unconstructed statistics have the first value. A second value is assigned to the unconstructed statistics and a second projected query cost is computed for the query wherein the unconstructed statistics have the second value. The first and second projected query costs are compared and the determination of essential statistics is discontinued if the first and second projected query costs are equivalent. If the first and second projected query costs are not equivalent, an unconstructed statistic is selected to build and process is repeated until the first and second projected query costs are equivalent or all the unconstructed potentially relevant statistics have been constructed. Statistics which do not sufficiently impact a query plan may be added to a drop list for elimination.

72 Claims, 11 Drawing Sheets

OTHER PUBLICATIONS

Haas P.J., Naughton J.F., Seshadri S., Stokes L., "Sampling–Based Estimation of the Number of Distinct Values of an Attribute." Proceedings of the 21st VLDB Conference, pp. 311–322, 1995.

Ioannidis Y., Poosala V., "Balancing Histogram Optimality and Practicality for Query Result Size Estimation." Proceedings of the ACM SIGMOD International Conference on Management of Data, pp. 233–245, 1995.

Poosala V., Ioannidis Y., Haas P., Shekita E., "Improved Histograms for Selectivity Estimation of Range Predicates." Proceedings of the ACM SIGMOD International Conference on Management of Data, pp. 294–305, 1996.

Slutz, D., Massive Stochastic Testing of SQL, Proceedings of VLDB, 1998.

Poosala V., Ioannidis Y., "Selectivity Estimation Without the Attribute Value Independence Assumption", Proceedings of the 23rd VLDB Conferenece, Athens, Greece, 1997, pp. 486–495.

Labio, W.J., Quass D., Adelberg B., "Physical Database Design for Data Warehouses", Proc. of ICDE97.

Manku G.S., Rajagopalan S., Lindsay B., "Approximate Medians and other Quantiles in One Pass and with Limited Memory". Proc of SIGMOD 1998, pp. 426–435.

* cited by examiner

AUTOMATING STATISTICS MANAGEMENT FOR QUERY OPTIMIZERS

RELATED APPLICATIONS

This application is a Continuation in Part of application Ser. No. 09/342,988 filed on Jun. 29, 1999 now U.S. Pat. No. 6,363,371 entitled "Identifying Essential Statistics for Query Optimization".

TECHNICAL FIELD

The present invention relates generally to the field of database systems. More particularly, the present invention relates to the field of query optimization for database systems.

BACKGROUND OF THE INVENTION

Computer database systems manage the storage and retrieval of data in a database. A database comprises a set of tables of data along with information about relations between the tables. Tables represent relations over the data. Each table comprises a set of records of data stored in one or more data fields. The records of a table are also referred to as rows, and the data fields of records in a table are also referred to as columns.

A database server processes data manipulation statements or queries, for example, to retrieve, insert, delete, and update data in a database. Queries are defined by a query language supported by the database system. To enhance performance in processing queries, database servers use information about the data distribution to help access data in a database more efficiently. Typical servers comprise a query optimizer which estimate the selectivity of queries and generate efficient execution plans for queries. Query optimizers generate execution plans based on the data distribution and other statistical information on the column(s) of the table(s) referenced in the queries. For example, information about data distribution is used to approximate query processing, load balancing in parallel database systems, and guiding the process of sampling from a relation.

The increasing importance of decision support systems has amplified the need to ensure that optimizers produce query plans that are as optimal as possible. The quality of the optimizer is the most important factor in determining the quality of the plans. The query optimizer component of a database system relies on the statistics on the data in the database for generating query execution plans. The availability of the necessary statistics can greatly improve the quality of plans generated by the optimizer. In the absence of statistics, the cost estimates can be dramatically different, often resulting in a poor choice of execution plans. On the other hand, the presence of statistics that are not useful may incur a substantial overhead due to cost of creation and the cost of keeping them updated. As an example of the impact of statistics on quality of plans, consider a tuned TPC-D IGB database on Microsoft SQL Server 7.0 with 13 indexes and workload consisting of the 17 queries defined in the benchmark. In all but two queries, the availability of statistics resulted in improved execution cost.

Despite its importance, the problem of automatically determining the necessary statistics to build and maintain for a database has received little or no attention. The task of deciding which statistics to create and maintain is a complex function of the workload the database system experiences, the optimizer's usage of statistics, and the data distribution itself.

SUMMARY OF THE INVENTION

Techniques for creating and maintaining only those statistics which are essential to query optimization of a given workload may be leveraged to automate statistics management in databases.

A method performed in accordance with one embodiment of the invention identifies statistics for use in executing one or more queries against a database. The method may be implemented by computer-executable instructions of a computer readable medium. A database system may perform the method with suitable means.

In accordance with the invention, a set of potentially relevant statistics is examined to determine if they may belong to a set of essential statistics for managing the database. A plurality of projected query costs are computed by assigning a range of selectivity values to the potentially relevant statistics and a set of essential statistics is formed based on the plurality of projected query costs. Additional statistics may be constructed if the plurality of projected query costs differ from each other by less than a predetermined threshold amount.

Statistics which are deemed non-essential may be added to a list of statistics to be dropped when an elimination criterion is met, for example when the cost of maintaining the statistic reaches a predetermined maximum.

If the plurality of projected query costs differ by more than the threshold amount a next statistic to be constructed may be selected based on a predetermined criteria, for example the relevancy of the statistic to relatively expensive operators.

For an embodiment of the method particularly suited to automated database management, an initial set of essential statistics is compiled by examining a set of potentially relevant statistics to determine if they may belong to a set of essential statistics for managing the database. A plurality of projected query costs are computed by assigning a range of selectivity values to the potentially relevant statistics and a set of essential statistics is formed based on the plurality of projected query costs. Additional statistics may be constructed if the plurality of projected query costs differ by less than a predetermined threshold amount from each other. Non-essential statistics are eliminated by identifying a subset of the initial set of statistics equivalent to the initial set of statistics with respect to a query. The subset and initial set may be determined to be equivalent if an execution plan for each query using the subset of statistics is the same as an execution plan for that query using the initial set of statistics and/or if a cost estimate to execute each query against the database using the subset of statistics is within a predetermined amount of a cost to execute that query against the database using the initial set of statistics.

The addition of statistics to the initial set of essential statistics and the elimination of non-essential statistics may be performed in real time after a predetermined number of queries or amount of time has elapsed. The addition of statistics to the initial set of essential statistics and the elimination of non-essential statistics may be performed off line on a workload log of stored previously executed queries. The addition of statistics to the initial set of essential statistics may be performed by assigning a probability of creation to a statistic based on the proportional amount of the query workload to which it is potentially relevant.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE PREFERRED EMBODIMENT

Techniques for creating and maintaining only those statistics which are essential to query optimization of a given workload may be leveraged to automate statistics management in databases.

Exemplary Operating Environment

Figure 1:
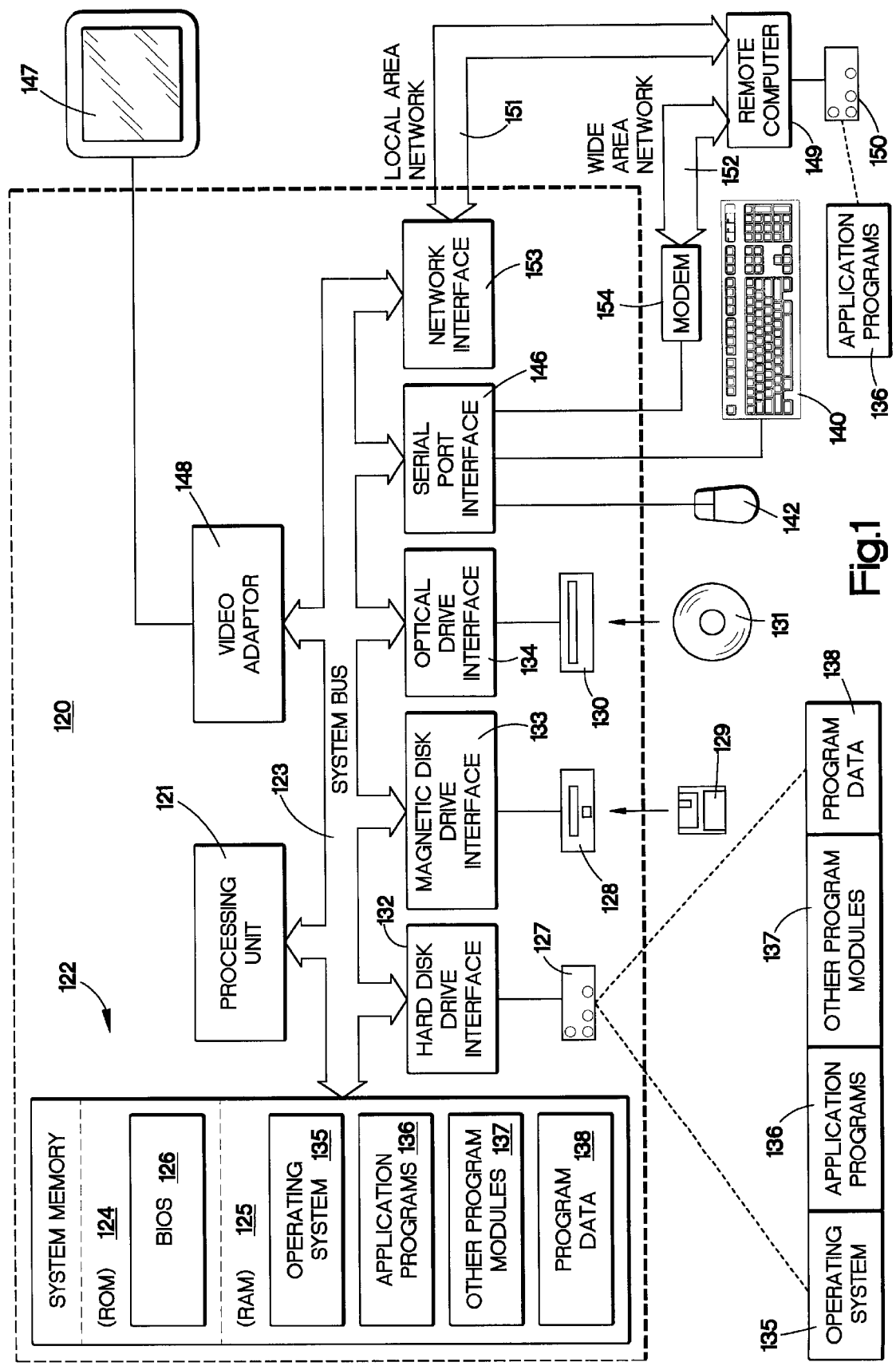
FIG. 1 illustrates an exemplary operating environment for identifying an initial set of statistics and for identifying an essential set of statistics from the identified initial set for query optzation.

FIG. 1 and the following discussion are intended to provide a brief, general description of a suitable computing environment in which the invention may be implemented. Although not required, the invention will be describe in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 124 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, containing the basic routines that help to transfer information between elements within personal computer 120, such as during start-up, is stored in ROM 124. Personal computer 120 further includes a hard disk drive 127 for reading from and writing to a hard disk, a magnetic disk drive 128 for reading from or writing to a removable optical disk 131 such as a CD ROM or other optical media. Hard disk drive 127, magnetic disk drive 128, and optical disk drive 130 are connected to system bus 123 by a hard disk drive interface 132, a magnetic disk drive interface 133, and an optical drive interface 134, respectively. The drives and their associated computer-readable media provide nonvolatile storage of computer-readable instructions, data structures, program modules and other data for personal computer 120. Although the exemplary environment described herein employs a hard disk, a removable magnetic disk 129 and a removable optical disk 131, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into personal computer 120 through input devices such as a keyboard 140 and pointing device 142. Other input devices may include a microphone, joystick, game pad, satellite dish, scanner, or the like. These and other input devices are often connected to processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as a video adapter 148. In addition to the monitor, personal computers typically include other peripheral output devices such as speakers and printers.

Personal computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to personal computer 120, although only a memory storage device 150 has been illustrated in FIG. 1. The logical connections depicted in FIG. 1 include local area network (LAN) 151 and a wide area network (WAN) 152. Such networking environments are commonplace in offices, enterprise-wide computer networks, intranets, and the Internet.

When using a LAN networking environment, personal computer 120 is connected to local network 151 through a network interface or adaptor 153. When used in a WAN networking environment, personal computer 120 typically includes a modem 154 or other means for establishing communication over wide area network 152, such as the Internet. Modem 154, which may be internal or external, is connected to system bus 123 via serial port interface 146. In a networked environment, program modules depicted relative to personal computer 120, or portions thereof, may be stored in remote memory storage device 150. It will be appreciated that the network connections shown are exemplary and other means of establishing a communications link between the computers may be used.

Database System

Figure 2:
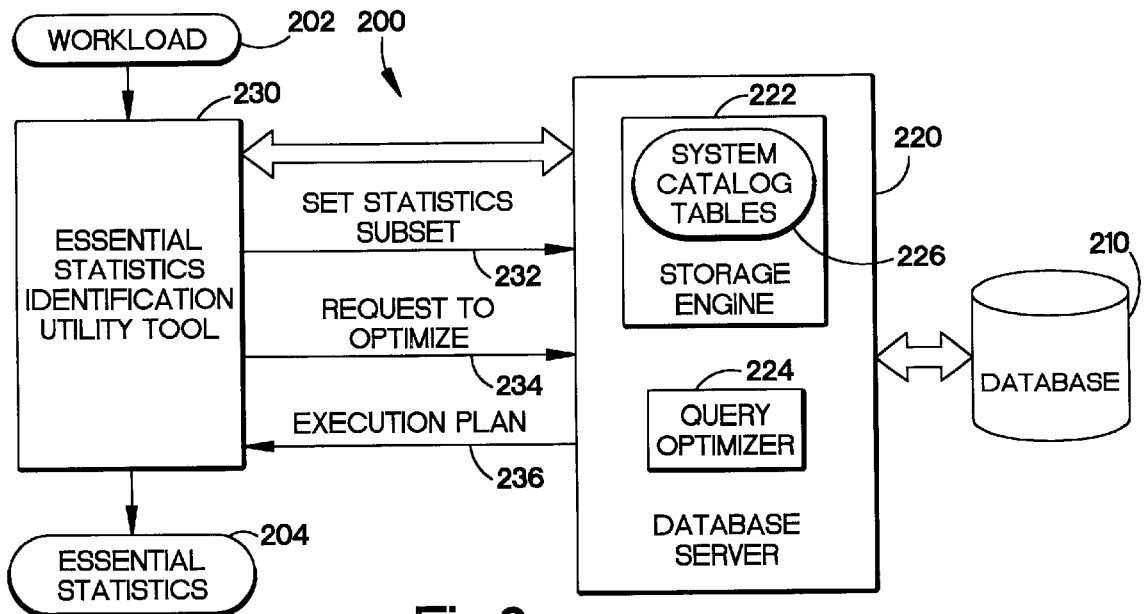
FIG. 2 illustrates an exemplary database system for identifying an initial set of statistics and for identifying an essential set of statistics from the identified initial set for query optimization.

FIG. 2 illustrates one example of a computer database system 200 for generating an initial set of statistics and for identifying essential statistics for query optimization. Database system 200 comprises a database 210, a database server 220, and an essential statistics identification utility tool 230. Database system 200 manages the storage and retrieval of data in database 210 in accordance with data manipulation statements or queries presented to database system 200 by a database application or by a user, for example.

Database 210 comprises a set of tables of data along with information about relations between the tables. Tables represent relations over the data. Each table comprises a set of records of data stored in one or more data fields. The records of a table are also referred to as rows, and the data fields of records in a table are also referred to as columns.

Database server 220 processes queries, for example, to retrieve, insert, delete, and/or update data in database 210. Database system 200 may support any suitable query language, such as Structured Query Language (SQL) for example, to define the queries that may be processed by database server 220. Suitable SQL queries include, for example, Select, Insert, Delete, and Update statements. Database server 220 for one embodiment comprises the Microsoft® SQL Server.

Database server 220 comprises a storage engine 222 for accessing data in database 210. To enhance performance in processing queries, database server 220 uses indexes to help access data in database 210 more efficiently. An index may be single-column or multi-column and may be clustered or non-clustered. Database server 220 comprises a query optimizer 224 to generate efficient execution plans for queries with respect to a set of indexes. In generating execution plans, query optimizer 224 relies on statistics on column(s) of table(s) referenced in a query to estimate, for example, the cost in time to execute the query against database 210 using more than one possible execution plan for the query. Query optimizer 224 may then choose among possible execution plans for the query. The notations Plan(Q,S) and Cost(Q,S) respectively represent the plan chosen by query optimizer 224 for a query Q and the execution cost of query Q estimated by query optimizer 224 using an available set of statistics S.

Query optimizer 224 may use any suitable statistics of any suitable structure for query optimization. A statistic is a summary structure associated with a set of one or more columns in a relation. One commonly used statistical descriptor is a histogram. Database server 220 may store statistics in system catalog tables 226, for example.

A set of statistics S can be denoted by a set comprising single-columns and/or multi-columns. Thus, the set $\{R_1.a, R_1.c, (R_2.c, R_2.d)\}$ represents a set of three statistics comprising single-column statistics on $R_1.a$, that is on column a of relation $R_1$, and $R_1.c$ and also comprising multi-column statistics on the two-column combination $(R_2.c, R_2.d)$. The notation $(R_2.c, R_2.d)$ denotes a two-dimensional statistic on columns c and d of relation $R_2$. The number of statistics in the set S is denoted by $|S|$.

Suitable single-column statistics comprise a histogram of values in the domain of that column and may include one or more of the following parameters: the number of distinct values in the column, the density of values in the column, and the second highest and the second lowest values in the column. Suitable multi-column statistics represent information on the distribution of values over the Cartesian product of the domains in it. As one example, multi-column statistics on $(R_2.c, R_2.d)$ may contain information on the joint distribution of values over $R_2.c$ and $R_2.d$. Where database server 220 comprises the Microsoft® SQL Server, such multi-column statistics contain joint density information and a histogram on the leading dimension $R_2.c$. As another example, such multi-column statistics may contain a histogram structure such as Phased or MHIST-p.

Although the availability of statistics can greatly improve cost estimation and the quality of execution plans chosen by query optimizer 224, creating as well as maintaining statistics can incur significant costs in storage, time, and memory, particularly where database 210 is large. The space of single-column and multi-column statistics can be very large since many combinations of columns are possible. Statistics can therefore consume significant amounts of secondary storage. Also, to remain effective, statistics need to be updated as the data in database 210 changes. The cost of updating statistics on columns of large tables can be substantial. Updating statistics on a column requires scanning the table for values in that column and sorting the values to produce, for example, a histogram and other statistics. Furthermore, query optimizer 224 loads all potentially relevant statistics for a query into memory during optimization. Multiple users concurrently running against database server 220, for example, can incur significant costs in CPU time and memory for loading statistics.

Essential statistics identification utility tool 230 attempts to reduce or minimize the overhead associated with statistics by constructing an initial set of essential statistics composed of those statistics having particular utility or by identifying from an initial set of statistics a set of essential statistics 204 that provide query optimizer 224 with the ability to choose among execution plans with minimized loss in accuracy as compared to using the initial set of statistics. Essential statistics identification utility tool 230 identifies essential statistics 204 from the initial set of statistics based on a workload 202 of one or more queries.

Workload 202 may be any suitable set of one or more queries. Workload 202 may be, for example, a representative set of one or more queries to be executed against database 210. Workload 202 may be an organization specific representative workload used by a database administrator or a set of one or more queries identified by logging events at database server 220. Where database server 220 comprises the Microsoft® SQL Server, for example, the database administrator can use the SQL Server Profiler to log all queries that executed on database server 220 over the past week, for example. In addition, filters can be applied on a number of properties of the events in the log to select queries in accordance with a predetermined criteria. Queries that take at least one second to execute, for example, may be logged.

By exploiting the knowledge of the queries that database system 200 is to service, essential statistics identification utility tool 230 helps database system 200 to avoid constructing and maintaining statistics that are rarely or never referenced in executing queries on database system 200 and to construct and maintain statistics that are crucial for some queries and thereby avoid poor choices in execution plans.

Database server 220, storage engine 222, query optimizer 224, and essential statistics identification utility tool 230 are implemented for one example as program modules or computer-executable instructions and may be stored on any suitable computer-readable medium for execution in a suitable operating environment, such as the computing environment of FIG. 1 for example. The data of database 210 and system catalog tables 226 may be implemented in the form of one or more suitable data structures and may also be stored on any suitable computer-readable medium.

Essential Statistics

Essential statistics identification utility tool 230 attempts to identify an essential set of statistics 204 characterized by two properties: admissible degree of error and minimality.

The property of an admissible degree of error may be defined in terms of equivalence, such as plan equivalence and/or optimizer-cost equivalence for example. A set of statistics $S_1$ is plan equivalent to a set of statistics $S_2$ with respect to a query Q if and only if $Plan(Q,S_1)=Plan(Q,S_2)$. A set of statistics $S_1$ is optimizer-cost equivalent to a set of statistics $S_2$ with respect to a query Q if and only if $S_1$ has a relative cost difference less than a predetermined amount or k percent with respect to $S_2$ and Q, that is if and only if $Cost\text{-}Diff(Q,S_1,S_2)=ABS(Cost(Q,S_1)-Cost(Q,S_2))/Cost(Q,S_2) \leq k\%$. Noting that both plan and optimizer-cost equivalence may be used and that k may be zero, a set of statistics $S_1$ is strongly equivalent to a set of statistics $S_2$ with respect to a query Q if and only if (1) $Plan(Q,S_1)=Plan(Q,S_2)$ and (2) $Cost(Q,S_1)=Cost(Q,S_2)$. As used herein, the terms equivalent and equivalence encompasses not only plan equivalence and/or optimizer-cost equivalence.

The property of minimality is orthogonal to the admissible degree of error. Minimality imposes an optimization criterion for choosing among all subsets of the initial set of statistics that are equivalent to help reduce the overhead associated with the creation and maintenance of statistics. Exemplary minimal essential sets include simple essential sets, memory-minimal essential sets, and update-cost-minimal essential sets.

A simple essential set of statistics with respect to a given initial set of statistics S and a given query Q is a subset $S_1$ of S such that $S_1$ but no proper subset of $S_1$ is equivalent to S with respect to Q. No statistics may be removed from an essential set of statistics without violating the applicable test of equivalence.

As one example where a query Q is SELECT*FROM $T_1$, $T_2$ WHERE $T_1.a=T_2.b$ AND $T_1.c<100$, an initial set of statistics $S=\{T_1.a, T_2.b, T_1.c\}$, and a subset of statistics $S_1=\{T_1.a, T_2.b\}$, $S_1$ is an essential set of statistics satisfying the strongly equivalent property if all of the following conditions are true:

(1) $Plan(Q,S_1)=Plan(Q,S)$ and $Cost(Q,S_1)=Cost(Q,S)$;

(2) $Plan(Q,\{T_1.a\})!=Plan(Q,S)$ or $Cost(Q,\{T_1.a\})!=Cost(Q,S)$;

(3) $Plan(Q,\{T_2.b\})!=Plan(Q,S)$ or $Cost(Q,\{T_2.b\})!=Cost(Q,S)$; and (4) $Plan(Q,\{\})!=Plan(Q,S)$ or $Cost(Q,\{\})!=Cost(Q,S)$.

A given initial set of statistics S may have multiple essential sets of statistics with respect to the same query Q. Query optimizer 224 may then choose among the essential sets by comparing, for example, the number of statistics in each essential set or the total update cost of each essential set.

A memory-minimal essential set of statistics with respect to a given initial set of statistics S and a query Q is the simple essential set of statistics with respect to the initial set of statistics S and the query Q having the least number of statistics. Because single-column and multi-column statistics each typically occupy about the same amount of memory, minimizing the cardinality of the chosen essential set helps minimize the total amount of memory that may be needed during optimization of the query Q, particularly considering all the chosen statistics may need to be loaded.

An update-cost-minimal essential set of statistics with respect to a given initial set of statistics S and a query Q is a subset $S_1$ of S such that among all subsets of S that are equivalent to S with respect to Q, the sum of update cost parameters of the statistics of $S_1$ is the least. Any suitable update cost parameter may be used for each statistic $s_i$ of S. Suitable update cost parameters may depend on, for example, the nature of the statistic, whether single-column or multi-column; the size of the relation on which the statistic is defined; and/or the frequency of updates on column values. An update cost parameter $w_i$ that reflects an aggregate value of such costs may be associated with each statistic $s_i$. As one example where database server 220 comprises the Microsoft® SQL Server, the time to update an already created statistic $s_i$ is logged by database server 220 and may be used as cost parameter $w_i$.

Given a workload W 202 of one or more queries Q, an essential set of statistics with respect to a given initial set of statistics S and workload W 202 is a subset $S_1$ of S that is equivalent to S with respect to every query Q of workload W 202. The notion of equivalence with respect to workload W 202 may also be relaxed by only requiring equivalence with respect to at least a predetermined fraction of queries Q in workload W 202.

Monotonicity Assumption and Critical Statistics

As additional statistical information helps query optimizer 224 improves its cost estimations, the following monotonicity assumption is made. Given an initial set of statistics S and a query Q, if a subset $S_1$ of S is not equivalent to S with respect to query Q, then none of the subsets of $S_1$ are equivalent to S with respect to query Q.

As a consequence of the monotonicity assumption, if a given statistic $s_i$ is removed from a given set of statistics S and the remaining subset of statistics $S-\{s_i\}$ is not equivalent to S, the statistic $s_i$ is critical to S.

As one example where a query Q is SELECT*FROM $T_1$, $T_2$ WHERE $T_1.a=T_2.b$ AND $T_1.c<100$, an initial set of statistics $S=\{T_1.a, T_2.b, T_1.c\}$, and (1) $Plan(Q,S-\{T_1.a\})!=Plan(Q,S)$, (2) $Plan(Q,S-\{T_2.b\})!=Plan(Q,S)$, and (3) $Plan(Q,S-\{T_1.c\})=Plan(Q,S)$ and $Cost(Q,S-\{T_1.c\})=Cost(Q,S)$, then the set $\{T_1.a, T_2.b\}$ is the set of critical statistics of S for strong equivalence with respect to the query Q.

The set of critical statistics of a given initial set of statistics S with respect to a query Q is a subset of every essential set of statistics of S with respect to query Q. The set of critical statistics of S with respect to a query Q may therefore be identified as a seed subset of statistics that may be grown to identify an essential set of statistics with respect to query Q. As the critical statistics for every query Q of a workload W 202 must be part of the essential set of statistics for workload W 202, the seed subset for workload W 202 is the union of the seed subsets for each query Q of workload W 202. Accordingly, the union of the critical statistics of a given initial set of statistics S with respect to each query Q of a workload W 202 is a subset of every essential set of statistics of S with respect to workload W 202.

Essential Statistics Identification Utility Tool

Figure 3:
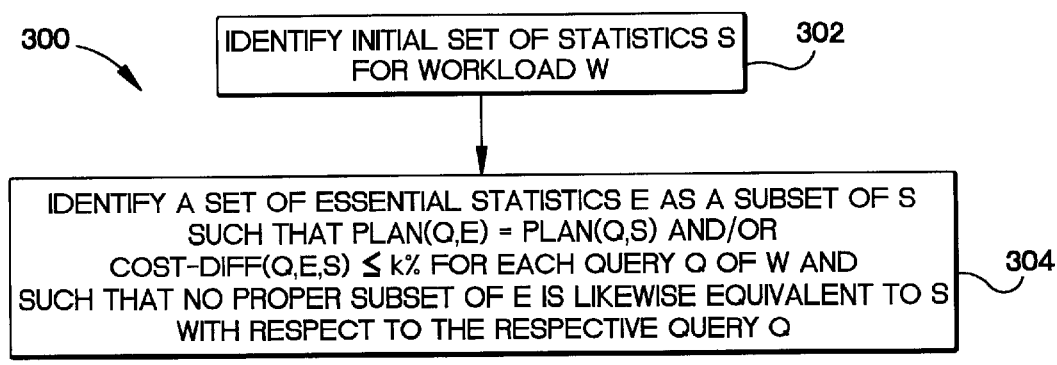
FIG. 3 illustrates a flow diagram for one example of a technique for identifying an essential set of statistics from an initial set of statistics.

Essential statistics identification utility tool 230 identifies a set of essential statistics E 204 in accordance with flow diagram 300 of FIG. 3.

For step 302 of FIG. 3, essential statistics identification utility tool 230 identifies an initial set of statistics S for a workload W 202 of one or more queries. Essential statistics identification utility tool 230 may identify the initial set of statistics from an existing or already constructed set of statistics or may generate the initial set of statistics S using any suitable technique.

For step 304 of FIG. 3, essential statistics identification utility tool 230 identifies an essential set of statistics E 204 as a subset of the initial set of statistics S that is equivalent to the initial set S with respect to each query Q of workload W 202. Essential statistics identification utility tool 230 for one example identifies an essential set of statistics E 204 for step 304 such that no proper subset of the essential set E 204 is likewise equivalent to the initial set S with respect to the respective query Q. Essential statistics identification utility tool 230 may identify an essential set of statistics E 204 in accordance with any suitable notion of minimality.

In identifying an essential set of statistics E 204, essential statistics identification utility tool 230 invokes query optimizer 224 to obtain an execution plan Plan(Q, S') and/or an estimated cost Cost(Q,S') for a query Q when a set of statistics S' is available to query optimizer 224.

For one example, as illustrated in FIG. 2, essential statistics identification utility tool 230 issues to database server 220 a set statistics subset command 232 to specify a set of statistics S' available to query optimizer 224 and issues a request to optimize command 234 specifying a query Q to request an execution plan Plan(Q,S') and/or an estimated cost Cost(Q,S') from query optimizer 224. Essential statistics identification utility tool 230 for one example invokes query optimizer 224 in a no-execution mode so as to request plan 236 from query optimizer 224 without actually executing that plan. Query optimizer 224 returns to essential statistics identification utility tool 230 a plan 236 comprising the requested execution plan Plan(Q,S') and/or estimated cost Cost(Q,S') to execute query Q using the specified set of statistics S'.

Where database server 220 comprises the Microsoft® SQL Server, query optimizer 224 by default considers all available statistics during query optimization. To obtain an execution plan and/or an estimated cost of a query using only a subset of the available statistics, the Microsoft® SQL Server may be extended to support an interface for set statistics subset command 232.

One exemplary interface is Ignore_Statistics_Subset (db_id, stat_id_list), where db_id is an identifier for database 210 and stat_id_list is a list of statistics that are to be ignored during query optimization. To implement this call, the information passed in by essential statistics identification utility tool 230 is stored in a connection specific buffer in database server 220. Making the call connection specific allows multiple client tools to operate concurrently. Subsequently, when a query is optimized from the same connection, query optimizer 224 ignores the subset of statistics in the buffer.

Another exemplary interface is Set_Statistics_Subset (db_id, table_id, stat_id_list), where db_id is an identifier for database 210, table_id is an identifier for a table in database 210, and stat_id_list is a list of statistics on the identified table for consideration by query optimizer 224. This call may be similarly implemented as Ignore_Statistics_Subset(db_id, stat_id_list) only query optimizer 224 is to consider only the subset of statistics in the connection specific buffer for query optimization.

Query optimizer 224 returns plan 232 through the Showplan interface of the Microsoft® SQL Server. The information returned include the total estimated cost of each node in an execution plan tree, the operators in the plan and their arguments, and the parent-child relationship between operators in the plan. As the plan returned from the Microsoft® SQL Server may be stored as a string, essential statistics identification utility tool 230 can compare two plans using a string comparison operation.

Shrinking Set Technique

For one example, essential statistics identification utility tool 230 may identify an essential set of statistics E 204 for step 304 of FIG. 3 in accordance with a suitable shrinking set technique.

A shrinking set technique identifies an essential set of statistics with respect to a workload W 202 by removing one or more statistics from the initial set of statistics S and identifying the remaining statistics as an essential set if the remaining statistics remain equivalent to the initial set S with respect to every query Q of workload W 202. If no more statistics can be removed from the remaining statistics without losing this equivalence, the remaining statistics constitute a simple essential set.

Figure 4:
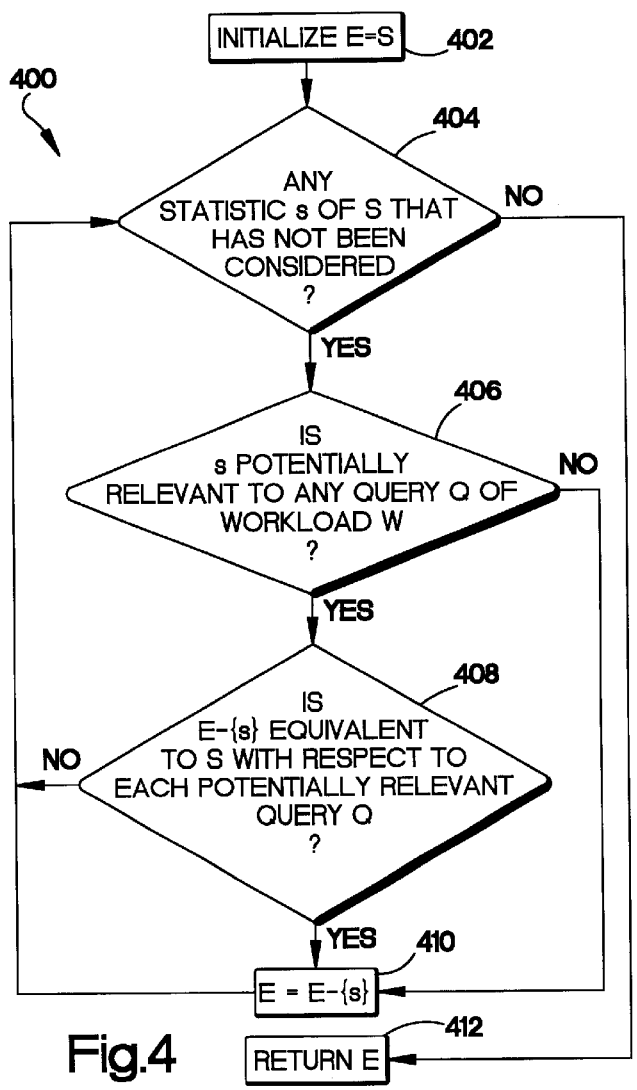
FIG. 4 illustrates a flow diagram for one example of a shrinking set technique for identifying an essential set of statistics.

One suitable shrinking set technique is illustrated in FIG. 4 as flow diagram 400. For step 402 of FIG. 4, the essential set of statistics E is initialized as the initial set of statistics S. For step 404, a statistic "s" that has not been previously considered from the initial set S is selected for consideration.

If the selected statistic "s" is potentially relevant to the execution of any one or more queries Q of workload W 202, each such query Q is selected for consideration for step 406. A statistic "s" may be potentially relevant to a query Q in accordance with any suitable notion of relevance. As one example, a statistic "s" may be potentially relevant to a query Q if the statistic "s" is on a column that occurs in (a) a WHERE clause, e.g., a selection or join condition, (b) a HAVING clause, and/or (c) a GROUP BY clause or equivalently a SELECT DISTINCT clause of query Q. Statistics on a column in a selection condition and on columns in a join condition can be used to help estimate the selectivity of the predicate. Similarly, statistics on a column in a GROUP BY clause can be used to help estimate the number of groups, that is distinct values, in the column.

As one example where a query Q is SELECT EmpName, Sum (Quantity*UnitPrice) FROM Sales WHERE OrderDate BETWEEN 'Oct. 1, 1998' AND 'Dec. 31, 1998' GROUP BY EmpName, statistics on Sales.OrderDate and Sales.EmpName are potentially relevant for optimization of the query Q.

If the currently identified essential set of statistics E would not lose its equivalence to the initial set S with respect to each selected query Q by removal of the selected statistic s, as determined for step 408, the selected statistic "s" is then removed from the currently identified essential set of statistics E for step 410. Otherwise, if the currently identified essential set of statistics E would lose its equivalence to the initial set S with respect to any one selected query Q by removal of the selected statistic s, the statistic "s" is retained in the essential set E.

If the selected statistic "s" is not potentially relevant to any query Q of workload W 202 as determined for step 406, the selected statistic s is then removed from the currently identified essential set of statistics E for step 410 as the removal of the selected statistic s would presumably not result in the currently identified essential set of statistics E losing its equivalence to the initial set S with respect to any query Q of workload W 202.

Steps 404–410 are repeated to consider every statistic s of the initial set S. When every statistic s of the initial set S has been considered, the resulting essential set of statistics E constitutes a simple essential set of statistics and is returned for step 412.

The shrinking set technique of FIG. 4 runs in time linear in the number of statistics in the initial set S. The running time, however, is dominated by the cost of step 408 in determining whether the removal of a selected statistic s would result in the currently identified essential set of statistics E losing its equivalence to the initial set S with respect to any potentially relevant query Q of workload W 202 as query optimizer 224 is invoked for each such determination. Although query optimizer 224 needs to be invoked only with respect to each query Q that is potentially relevant to a selected statistic s and even then only so long as the selected statistic s is not determined to be essential for step 408, optimizing complex queries is nevertheless time consuming. Furthermore, when the shrinking set technique runs from a client process, the overhead of crossing process boundaries between the client and server processes can be high.

Essential statistics identification utility tool 230 may attempt to reduce the number of calls to query optimizer 224 by quickly identifying from the initial set S an essential set of statistics S' for many queries Q of workload W 202 and then considering only those remaining queries Q of workload W 202 for which S' is not equivalent to S. As two examples, essential statistics identification utility tool 230 may identify an essential set of statistics E 204 in accordance with a suitable workload-cost-based shrinking set technique or a suitable per-statistic-based shrinking set technique.

Workload-cost-based Shrinking Set Technique

A workload-cost-based shrinking set technique performs a shrinking set technique on a set of relatively more expensive queries of workload W 202 to identify an essential set S' for such queries. A shrinking set technique is then performed to identify an essential set S" for those remaining queries of workload W 202 for which S' in not equivalent to S. An essential set E 204 for workload W 202 is then identified as the union of the essential sets S' and S".

Figure 5:
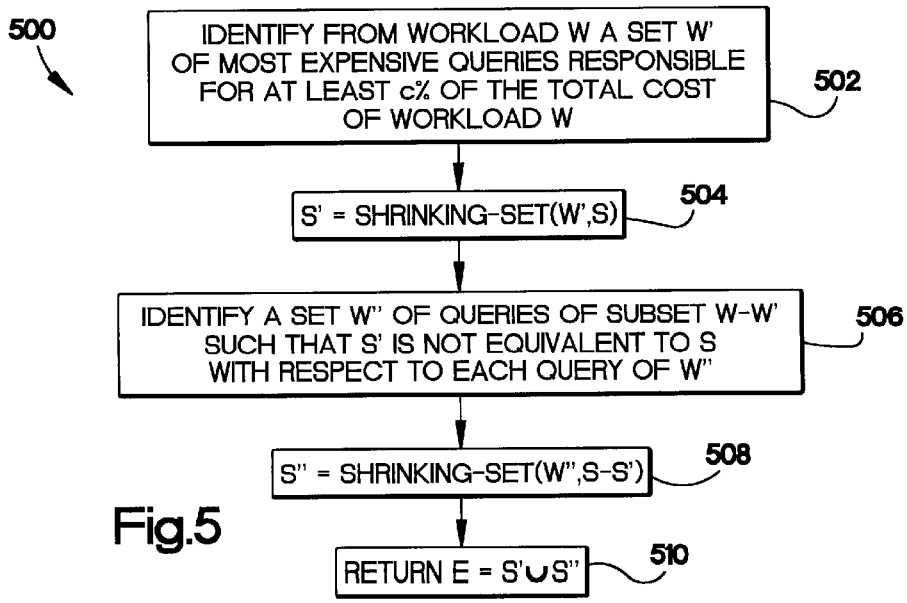
FIG. 5 illustrates a flow diagram for one example of a workload-cost-based shrinking set technique for identifying an essential set of statistics.

One suitable shrinking set technique is illustrated in FIG. 5 as flow diagram 500. For step 502 of FIG. 5, a set W' of the most expensive queries of workload W 202 responsible for at least a predetermined percentage c % of the total cost of workload W 202 is identified. The predetermined percentage c % may be any suitable value, such as a value in the range of approximately 15% to approximately 25% for example, and may be preset or input by a database administrator, for example. An essential set S' with respect to the most expensive query set W' is then identified for step 504 from the initial set S using a suitable shrinking set technique such as that of FIG. 4 for example.

For step 506, a set W" of queries from the remaining query subset W−W' is identified such that the essential set S' is not equivalent to the initial set S with respect to each query of the set W". An essential set S" with respect to the query set W" is then identified for step 508 from the remaining subset S−S' using a suitable shrinking set technique such as that of FIG. 4 for example. An essential set E 204 for workload W 202 is then returned for step 510 as the union of the essential sets S' and S".

Per-statistic-based Shrinking Set Technique

A per-statistic-based shrinking set technique associates with each statistics of the initial set S a number of expensive queries from workload W 202 for which the statistic s is potentially relevant and determines if the statistic s is essential for any such queries. Performing this technique for each statistic s of S forms an essential set S'. A shrinking set technique is then performed to identify an essential set S" for those remaining queries of workload W 202 for which S' in not equivalent to S. An essential set E 204 for workload W 202 is then identified as the union of the essential sets S' and S".

Figure 6:
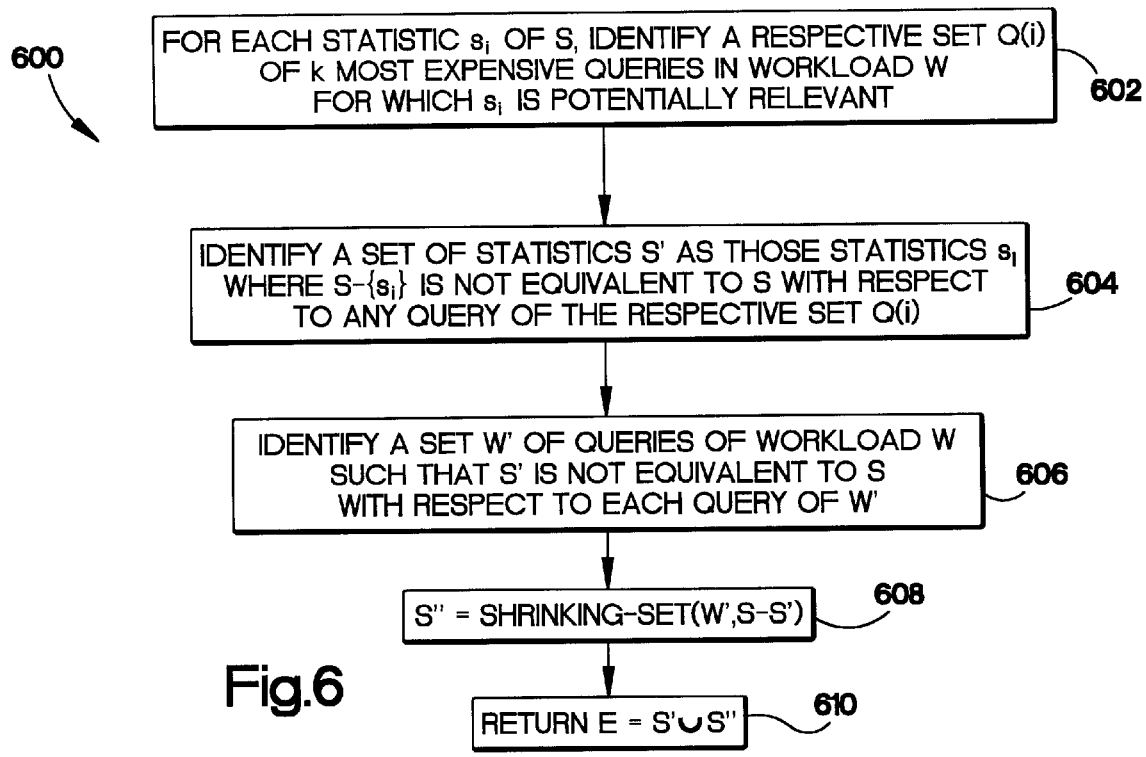
FIG. 6 illustrates a flow diagram for one example of a per-statistic-based shrinking set technique for identifying an essential set of statistics.

One suitable shrinking set technique is illustrated in FIG. 6 as flow diagram 600. For each statistic $s_i$ of the initial set S, a respective set Q(i) of at most a predetermined number k of the most expensive queries for which the statistic $s_i$ is potentially relevant is identified for step 602 from workload W 202. The predetermined number k may be any suitable number, such as a number in the range of approximately 3 to approximately 5 for example, and may be preset or input by a database administrator, for example. An essential set of statistics S' is then identified for step 604 as those statistics $s_i$ that are essential to any query of their respective set Q(i), that is where S−{$s_i$} is not equivalent to S with respect to any one query of the respective set Q(i).

For step 606, a set W' of queries from workload W 202 is identified such that the essential set S' is not equivalent to the initial set S with respect to each query of the set W'. An essential set S" with respect to the query set W' is then identified for step 608 from the remaining subset S−S' using a suitable shrinking set technique such as that of FIG. 4 for example. An essential set E 204 for workload W 202 is then returned for step 510 as the union of the essential sets S' and S".

Subset Enumeration Technique

For another example, essential statistics identification utility tool 230 may identify an essential set of statistics E 204 for step 304 of FIG. 3 in accordance with a suitable subset enumeration technique.

A subset enumeration technique identifies an essential set of statistics with respect to a workload W 202 by enumerating over subsets S' of the initial set of statistics S. The technique may enumerate over the subsets S' in a suitable order until a subset S' is identified as equivalent to the initial set S.

Figure 7:
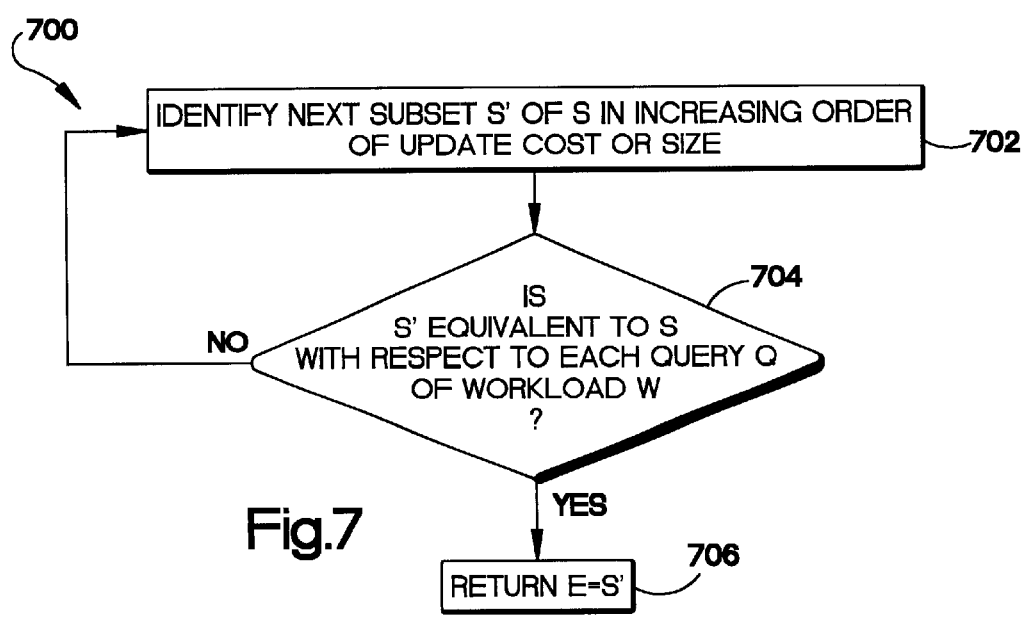
FIG. 7 illustrates a flow diagram for one example of a subset enumeration technique for identifying an essential set of statistics.

One suitable subset enumeration technique is illustrated in FIG. 7 as flow diagram 700. For step 702 of FIG. 7, a next subset of statistics S' from the initial set S is identified in increasing order of update cost, size, or any other suitable ordering criteria. If the identified subset S' is equivalent to the initial set S with respect to each query Q of workload W 202, as determined for step 704, the identified subset S' is returned as an essential set of statistics E for step 706. Otherwise, if the identified subset S' is not equivalent to the initial set S with respect to each query Q of workload W 202, steps 702–704 are repeated until a subset S' is identified as equivalent to the initial set S.

If the subsets S' are identified in increasing order of update cost, the subset enumeration technique returns an update-cost-minimal essential set for step 706. If the subsets S' are identified in increasing order of size, the subset enumeration technique returns a memory-minimal essential set for step 706.

Other suitable subset enumeration techniques may exhaustively enumerate over all subsets S' of the initial set S and select based on one or more suitable criteria from the subset(s) S' determined to be equivalent to the initial set S with respect to each query Q of workload W 202.

Critical Set Identification

Essential statistics identification utility tool 230 for other examples may identify an essential set of statistics E 204 for step 304 of FIG. 3 in accordance with a suitable critical set growing technique.

As the set of critical statistics of the initial set of statistics S with respect to a query Q is a subset of every essential set of statistics of S with respect to query Q, a critical set growing technique identifies a critical set of statistics with respect to each query Q of workload W 202 and augments or grows the critical set to identify an essential set for workload W 202.

Where workload W 202 has queries $Q_1, Q_2, \ldots Q_k$, the critical set $R_1$ for query $Q_1$ may be identified and then augmented to identify an essential set $E_1$ for query $Q_1$. This technique may then be repeated for the next query $Q_i$ until an essential set has been identified for each query of workload W 202 and used to form an essential set E 204 for workload W 202. Because a critical statistic for a query $Q_j$ may be a member of the set $E_i$-$R_i$ for another query $Q_i$, identifying the critical set for all queries in workload W 202 prior to augmenting the critical set for any one query in workload W 202 may prove more beneficial.

As one example where workload W 202 has two queries $Q_1$ and $Q_2$, the critical set $R_1 = \{T_1.a, T_2.b\}$, the critical set $R_2 = \{T_3.c, T_4.d\}$, and the essential set $E_1 = \{T_1.a, T_2.b, T_3.c\}$, no augmentation is required to identify the essential set $E_1$ based on the computed critical set $R = R_1 \cup R_2$ for workload W 202, noting $T_3.c$ is a critical statistic for query $Q_2$.

Essential statistics identification utility tool 230 may identify a critical set of statistics from the initial set of statistics S with respect to each query Q of workload W 202 in accordance with a suitable critical set identification technique.

A critical set identification technique identifies a statistic s of the initial set S as critical to each query Q of workload W 202 if the statistic s were removed from the initial set S and the remaining subset of statistics S-{s} is not equivalent to the initial set S with respect to each query Q of workload W 202.

Figure 8:
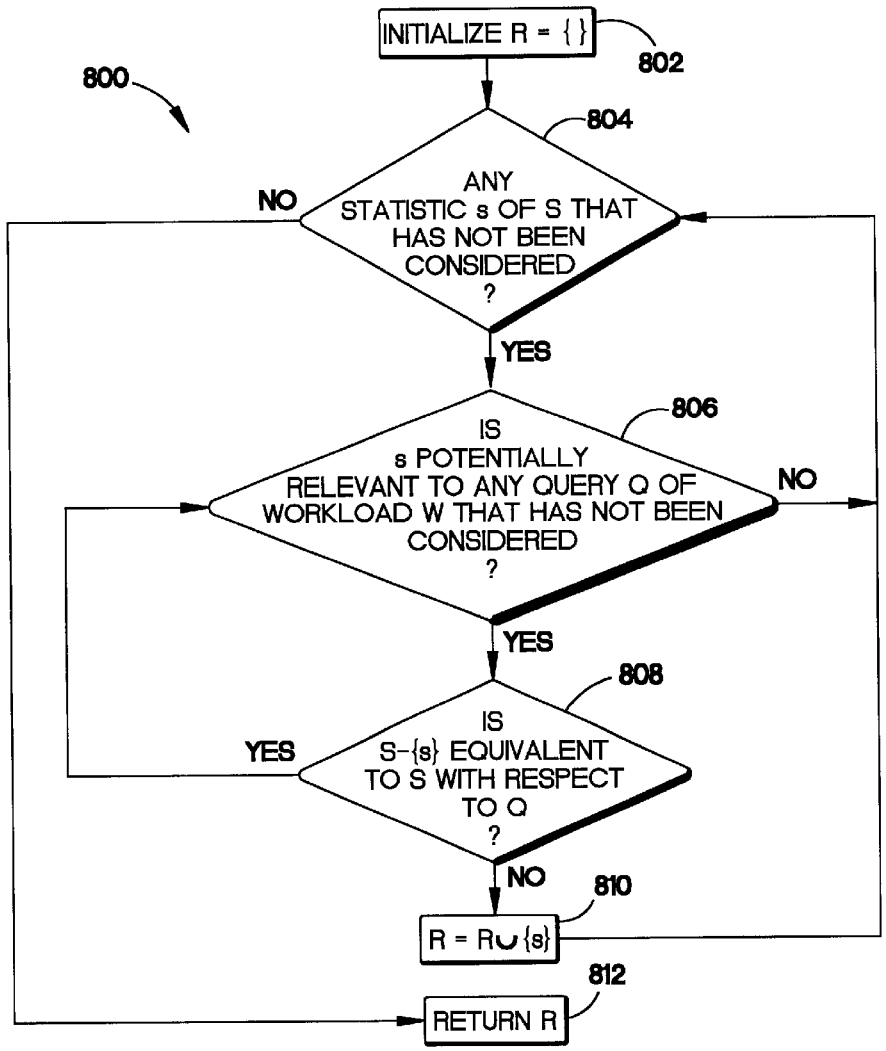
FIG. 8 illustrates a flow diagram for one example of a technique for identifying a critical set of statistics from an initial set of statistics.

One suitable critical set identification technique is illustrated in FIG. 8 as flow diagram 800. For step 802 of FIG. 8, a critical set R is initialized as an empty set. For step 804, a statistic s that has not been previously considered from the initial set S is selected for consideration.

If the selected statistic s is potentially relevant to the execution of a query Q that has not been previously considered from workload W 202 with respect to the selected statistic s, the query Q is selected for consideration for step 806.

If the initial set of statistics S absent the selected statistic s, that is the subset of statistics S-{s}, is not equivalent to the initial set S with respect to the selected query Q, as determined for step 808, the selected statistic s is identified as a critical statistic and added to the critical set R for step 810. Otherwise, if the subset S-{s} is equivalent to the initial set S with respect to the selected query Q, steps 806–808 are repeated until all queries Q potentially relevant to the selected statistic s have been considered as determined for step 806 or until the selected statistic s is identified as critical for step 808.

Steps 804–810 are repeated to consider every statistic s of the initial set S. When every statistic s of the initial set S has been considered, the resulting critical set R is returned for step 812.

The identified critical set for workload W 202 may then be augmented or grown with one or more additional statistics, if necessary, in accordance with a suitable technique to identify an essential set of statistics E 204 for workload W 202.

Critical Set Subset Enumeration Growing Technique

For one example, essential statistics identification utility tool 230 may identify an essential set of statistics E 204 by growing the critical set R for workload W 202 in accordance with a suitable critical set subset enumeration growing technique.

A critical set subset enumeration growing technique identifies from the initial set of statistics S the critical set R for workload W 202 and then augments the critical set by enumerating over subsets P' of the remaining statistics P=S−R. The technique may enumerate over the subsets P' in a suitable order until a subset R∪P' is identified as equivalent to the initial set S.

Figure 9:
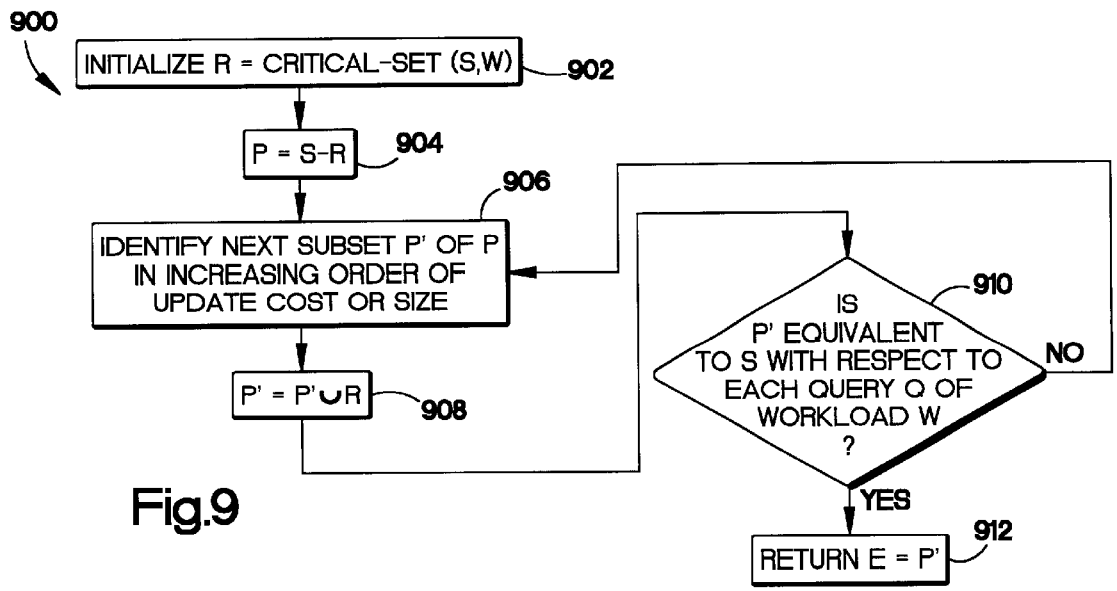
FIG. 9 illustrates a flow diagram for one example of a critical set subset enumeration growing technique for identifying an essential set of statistics.

One suitable critical set subset enumeration growing technique is illustrated in FIG. 9 as flow diagram 900. For step 902 of FIG. 9, the critical set R for workload W 202 is identified from the initial set of statistics S using a suitable critical set identification technique such as that of FIG. 8. For step 904, the remaining subset of statistics P=S−R is identified.

For step 906, a next subset of statistics P' from the subset P is identified in increasing order of update cost, size, or any other suitable ordering criteria. If the union of the identified subset P' with the critical set R, as determined for step 908, is equivalent to the initial set S with respect to each query Q of workload W 202, as determined for step 910, that union is returned as an essential set of statistics E for step 912. Otherwise, if the union of the identified subset P' with the critical set R is not equivalent to the initial set S with respect to each query Q of workload W 202, steps 906–910 are repeated until an essential set E 204 is identified.

If the subsets P' are identified in increasing order of update cost, the critical set subset enumeration growing technique returns an update-cost-minimal essential set for step 912. If the subsets P' are identified in increasing order of size, the critical set subset enumeration growing technique returns a memory-minimal essential set for step 912.

As one example where the subsets P' are enumerated in increasing order of updatecost and the remaining subset P=S−R={a(2), b(3), c(20), d(22)} with the numbers in parentheses representing the update cost for each associated statistic, the critical set subset enumeration growing technique enumerates over the subsets P' in the following order: {}(0), {a}(2), {b}(3), {a,b}(5), {c}(20), {a,c}(22), {d}(22), {b,c}(23), {a,d}(24), {b,d}(25), {a,b,c}(25), {a,b,d}(27), {c,d}(42), {a,c,d}(44), {b,c,d}(45), {a,b,c,d}(49).

Other suitable critical set subset enumeration growing techniques may exhaustively enumerate over all subsets P' and select based on one or more suitable criteria from the subset(s) P' whose union with the critical set R is determined to be equivalent to the initial set S with respect to each query Q of workload W 202.

Critical Set Partition Growing Technique

For another example, essential statistics identification utility tool 230 may identify an essential set of statistics E 204 by growing the critical set R for workload W 202 in accordance with a suitable critical set partition growing technique.

A critical set partition growing technique stems from the notion that if statistics from different relations do not interact significantly, then finding an essential set for each relation in each query Q of workload W 202 can be used to find an essential set for workload W 202. Indeed, statistics from different relations that do interact may already be members of the critical set for workload W 202.

As an example of a technique for this notion, the initial set of statistics S can be divided into partitions, each corresponding to a separate table in one query Q of workload W 202. An essential set for the one query Q may then be identified by enumerating over the subsets of each partition and identifying a subset of each partition such that the union of the identified partition subsets is equivalent to the initial set of statistics. This technique may be repeated for each query Q of workload W 202 to identify an essential set for workload W 202.

As one example where a query Q is SELECT*from $T_1, T_2$ WHERE $T_1.a=T_2.b$ AND $T_1.c<10$ AND $T_2.d=20$, the technique may place statistics on tables $T_1$ and $T_2$ from the initial set S in different partitions. The technique may then enumerate over the subsets of the table $T_1$ partition to identify a subset of the table $T_1$ partition such that the union of the identified subset of the table $T_1$ partition with the statistics of the table $T_2$ partition is equivalent to the initial set S. Given the identified subset of the table $T_1$ partition is $\{T_1.a\}$, the technique may then enumerate over the subsets of the table $T_2$ partition to identify a subset of the table $T_2$ partition such that the union of the identified subset of the table $T_2$ partition with the identified subset of the table $T_1$ partition, that is with $\{T_1.a\}$, is equivalent to the initial set S. Given the identified subset of the table $T_2$ partition is $\{T_2.b\}$, the technique identifies $\{T_1.a, T_2.b\}$ as an essential set for the query Q.

Because any essential set for workload W 202 comprises the critical set R for workload W 202, a critical set partition growing technique identifies the critical set R for workload W 202 and then augments the critical set R by enumerating, for each query Q of workload W 202, over subsets of partitions formed from the remaining statistics S–R for each table in the query Q.

Figure 10:
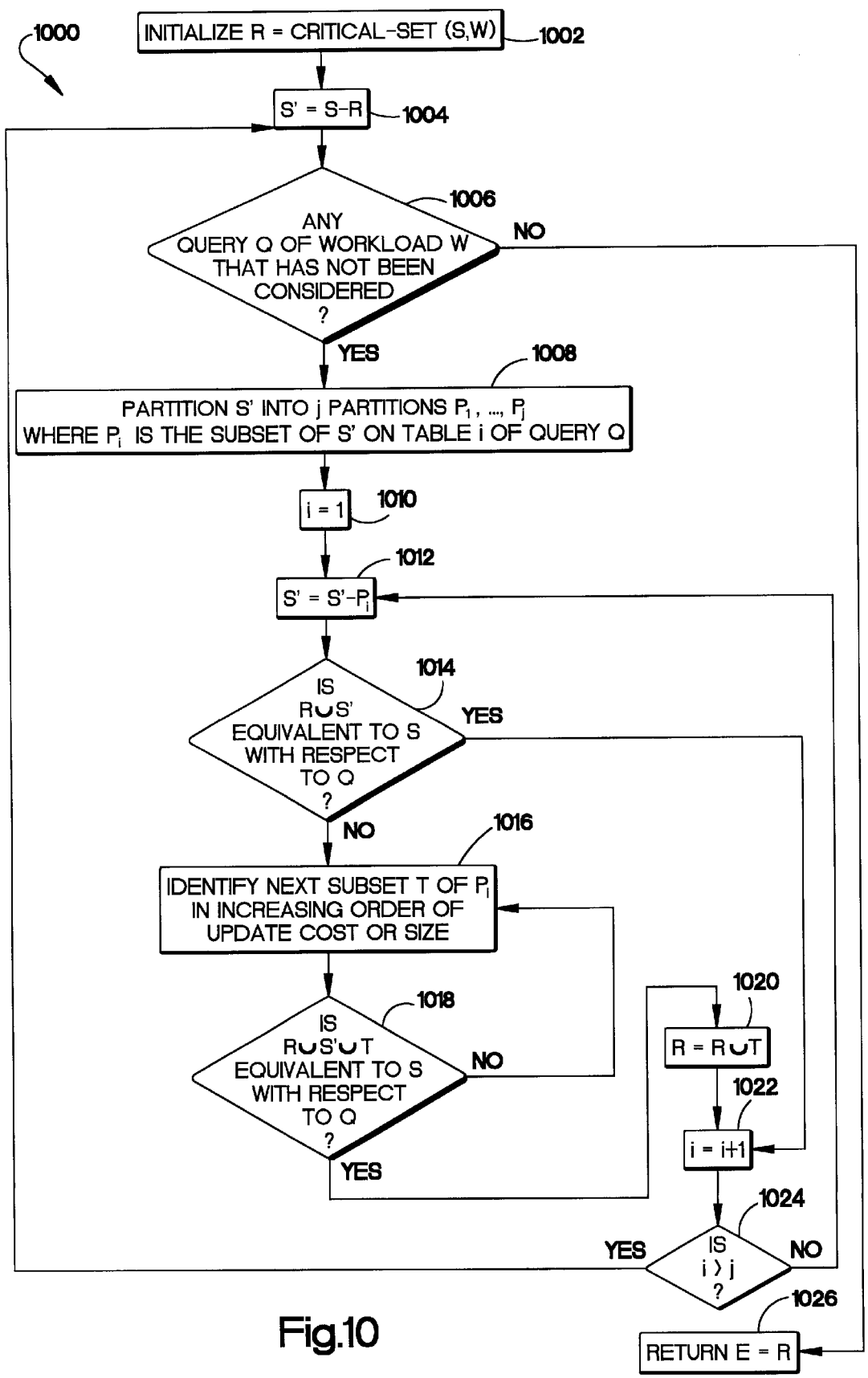
FIG. 10 illustrates a flow diagram for one example of a critical set partition growing technique for identifying an essential set of statistics.

One suitable critical set partition growing technique is illustrated in FIG. 10 as flow diagram 1000. For step 1002 of FIG. 10, the critical set R for workload W 202 is identified from the initial set of statistics S using a suitable critical set identification technique such as that of FIG. 8. For step 1004, the remaining subset of statistics S'=S–R is identified.

For step 1006, a next query Q that has not been previously considered from workload W 202 is selected for consideration. The subset S' is partitioned for step 1008 into j partitions $P_1, \ldots, P_j$ where $P_i$ is the subset of statistics of S' on table i of the selected query Q. Because one or more statistics of the subset S' may not belong in a partition $P_i$, the subset S' may not be fully partitioned. The variable i is initialized to one for step 1010, and the subset S' is redefined for step 1012 by removing all statistics of the partition $P_i$ from the subset S'.

If the union of the redefined subset S' with the current set R is not equivalent to the initial set S with respect to the selected query Q, as determined for step 1014, a next subset of statistics T from the partition $P_i$ is identified for step 1016 in increasing order of update cost, size, or any other suitable ordering criteria. If the union of the identified subset T with the redefined subset S' and the current set R is equivalent to the initial set S with respect to the selected query Q, as determined for step 1018, the current set R is redefined by adding the subset T to the current set R for step 1020. Otherwise, if the union of the identified subset T with the redefined subset S' and the current set R is not equivalent to the initial set S with respect to the selected query Q, steps 1016 and 1018 are repeated until the union of a next subset T with the redefined subset S' and the current set R is equivalent to the initial set S with respect to the selected query Q. If the union of the redefined subset S' with the current set R is equivalent to the initial set S with respect to the selected query Q. as determined for step 1014, the current set R is not redefined for partition $P_i$.

The variable i is incremented for step 1022 and compared to j for step 1024 to determine whether any partitions for the selected query Q remain for consideration. If so, steps 1012–1024 are repeated until all partitions $P_1, \ldots, P_j$ for the selected query Q have been considered as determined for step 1024.

Steps 1004–1024 are then repeated to consider partitions for any other queries Q of workload W 202. When all queries of workload W 202 have been considered, as determined for step 1006, the current set R is returned as an essential set E 204 for step 1026.

Workload Compression

The cost in time to identify an essential set of statistics E 204 for step 304 increases as the size of workload W 202 increases. Essential statistics identification utility tool 230 may attempt to reduce this overhead by performing a suitable workload compression technique in which an essential set of statistics E 204 is identified with respect to only a fraction of the number of queries Q of workload W 202, that is with respect to a compressed workload W. The more statistics are shared across multiple queries in workload W 202, the more statistics relevant to workload W 202 will be considered in identifying an essential set E 204. Any suitable criteria may be used to compress workload W 202 into a workload W'.

For one exemplary workload compression technique, essential statistics identification utility tool 230 may perform steps 502 and 504 of FIG. 5 to identify an essential set S' with respect to a compressed workload W' and return an essential set of statistics E 204 for workload W 202 as the identified essential set S'.

That is, a set W' of the most expensive queries Q of workload W 202 responsible for at least a predetermined percentage c % of the total cost of workload W 202 is identified. Where the execution cost of each query Q in workload W 202 is logged along with each query Q in workload W 202, such a compressed workload W' may be readily identified. The predetermined percentage c % may be any suitable value, such as a value in the range of approximately 15% to approximately 25% for example, and may be preset or input by a database administrator, for example.

An essential set S' with respect to the most expensive query set W' is then identified from the initial set S using a suitable shrinking set technique such as that of FIG. 4 for example. An essential set of statistics E 204 for workload W 202 is then returned as the identified essential set S'. For another example, this technique may be adapted to identify an essential set S' from among only those statistics of the initial set S that are potentially useful in at least c % of the total cost of workload W 202.

Dropping Non-essential Statistics

Once an essential set of statistics E 204 has been identified, the remaining or non-essential statistics of the initial set S may be dropped or removed from database server 220. Non-essential statistics may be dropped individually or in groups, such as all non-essential statistics on a table for example, and may be dropped in accordance with any suitable technique.

For one example, non-essential statistics may be dropped when the cost of maintaining them is high. Where database server 220 comprises Microsoft® SQL Server, for example, a row-modification-counter for each table is maintained to record the number of rows modified in the table since the last update of statistics on the table. Database server 220 updates statistics on the table when the counter for the table exceeds a fraction, such as 0.2 for example, of the table size. When a statistic identified as non-essential has been updated more than a predetermined amount of time, the non-essential statistic may be physically dropped from database server 220.

Magic Number Sensitivity Analysis

Figure 11:
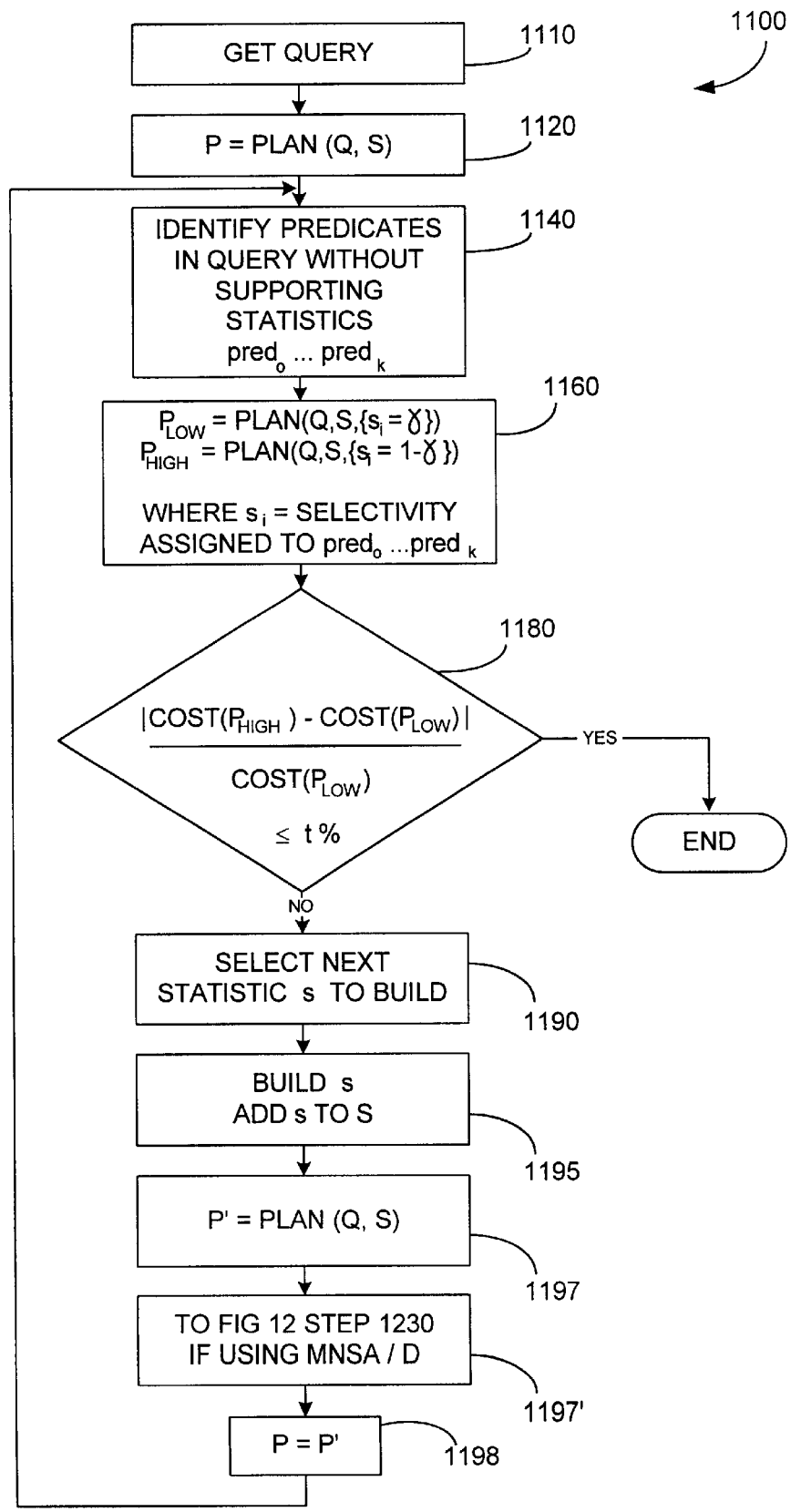
FIG. 11 illustrates a flow diagram for one example of a magic number sensitivity analysis technique for identifying an essential set of statistics.

Essential statistics identification utility tool 230 for other examples may identify an initial essential set of statistics E 204 for step 304 of FIG. 3 in accordance with a suitable magic number sensitivity analysis technique depicted in flow diagram 1100 of FIG. 11.

A technique called magic number sensitivity analysis (hereinafter MNSA) can be used to identify candidate statistics that cannot have an impact on the plan of the query without creating them in the first place. Using this technique it is possible to significantly reduce the cost of creating statistics for a query without affecting the quality of the execution plan generated. For example, let Q be the query: SELECT E.EmployeeName, D.DeptName FROM Employees E, Department D WHERE E.DeptId=D.DeptId AND E.Age<30 AND E.Salary>200K. Assume that statistics on the join columns as well as E.Salary already exist but no statistics on E.Age are available. Further, assume that the fraction of Employees satisfying the predicate (E.Salary>200K) is very small. In such a case, the join method chosen by the optimizer, and hence the plan for Q, is not likely to change even if we build statistics on E.Age. The goal of MNSA is to determine that statistics on E.Age are not useful without first building statistics on E.Age.

To implement MNSA, it is necessary to select a concept of equivalence to be used when comparing an existing set of statistics with a proposed set of statistics. Three possible choices for equivalence concepts are Execution-Tree equivalence, Optimizer-Cost equivalence, and t-Optimizer-Cost equivalence. Two sets of statistics S and S' are Execution-Tree equivalent for a query Q if the optimizer generates the same query execution tree for Q for both choices of S and S'. Execution-Tree equivalence is the strongest notion of equivalence since it implies execution cost equivalence. Two sets of statistics S and S' are optimizer-cost equivalent for query Q if the optimizer-estimated costs of the plans are the same irrespective of whether S or S' is used. In such cases, the plans generated by the optimizer for Q can still be different. Thus, this is a weaker notion of equivalence than Execution—Tree equivalence. t-Optimizer-Cost equivalence generalizes optimizer-cost equivalence.

While any number of equivalence concepts may be used to implement MNSA successfully, for purposes of this description the third notion of equivalence, t-Optimizer-Cost equivalence will be used. Estimated-Cost (Q,S) denotes the optimizer-estimated cost for query Q when the existing set of statistics is S, two sets of statistics S and S' are t-Optimizer-Cost equivalent if Estimated-Cost (Q,S) and Estimate-Cost (Q,S') are within t % of each other. This definition reflects the intuition that while analyzing the choice of statistics, it may be advantageous to ignore the difference among plans that differ in cost in a limited fashion. The value of t reflects the degree of rigor used to enforce equivalence. A value of t=20% has proven to be effective in experiments on Microsoft SQL Server. For the purposes of this description, the focus will be on Select-Project-Join (SPJ) queries.

In general, MNSA has two components, first a technique which detects when creating additional statistics would have no effect on the quality of plans generated by the optimizer. This can happen when, for the current database and the query, the existing set of statistics is adequate for obtaining the "best" possible plan for the query (i.e. as good a plan as having all the statistics). The second component to MNSA is a strategy for selecting the next statistic to create from the remaining candidate statistics when it is determined that additional statistics would improve the quality of the plan.

The first component of MNSA tests if the existing set of statistics for a database (denoted S) includes an essential set of Q but without creating statistics in C-S, where C denotes the set of candidate statistics for the query. A key to MNSA is to consider how the presence of statistics impacts optimization of queries. The optimizer uses statistics primarily for estimation of selectivity of predicates. For example, if a histogram is available on R.a and the query Q has a condition R.a<10, then the histogram is used to estimate a selectivity for the predicate. If statistics appropriate for a predicate are not available, then the optimizer uses a default "magic number' for the corresponding selectivity. Magic numbers are system wide constants between 0 and 1 that are predetermined for various kinds of predicates. For example, consider query Q in the above example. Since statistics on the column E.Age are not present, most relational optimizers use a default magic number, such as 0.30, for the selectivity of the range predicate on E.Age. Thus, for an SPJ query Q, the dependence of the optimizer on statistics can be conceptually characterized by a set of selectivity variables, with one selectivity variable corresponding to each predicate in Q. The specific value used for the selectivity variable for a predicate must be between 0 and 1. The value is determined either by using an existing statistic or by a default magic number.

By using a magic number the optimizer makes an implicit assumption about the effects of the missing candidate statistics. The optimizer's cost estimates for the query, and the final execution plan chosen are based on the magic numbers used.

MNSA varies the value of the magic numbers to simulate the possible effects of different hypothetical data distributions, thereby testing the sensitivity of the plan to changes in data distribution. If MSNA varies the value for the magic numbers used in optimizing the query and finds that the plan chosen by the optimizer remains the same for all the settings, it can be concluded with good confidence that any additional statistics will not have an effect on the plan for the query. On the other hand, if varying the magic number causes the plan to change it can be concluded that statistics on the column may be relevant for the query. Whether a statistic actually affects the plan of the query depends on the true data distribution of the column, and can only be determined once the statistic has been created. Therefore, use of MSNA may still create a statistic that has no impact on the plan chosen by the optimizer, which may later need to be eliminated using another of the techniques discussed herein. However, MNSA eliminates statistics that are irrelevant for the query being analyzed.

In general, a different magic number is used by the optimizer to make default estimations for the selectivity for each distinct predicate for which statistics on relevant columns are missing. Such predicates are referred to as the predicates without supporting statistics. A magic number setting for a query is an assignment of selectivities to each predicate in the query without supporting statistics. A magic number setting is denoted by $\{p_1=m_1, \ldots, p_k=m_k\}$ where $p_1, \ldots, p_k$ are the predicates in a query Q for which no supporting statistics are present, and $m_i$ is the selectivity assigned to $p_i$.

Referring to FIG. 11, a flowchart representation 1100 of a basic strategy for implementing a MNSA for a single-block Select-Project-Join query is outlined. In step 1110, a query is obtained for analysis and an execution plan Plan(Q,S), denoted "P" is formed based on the existing set of statistics S in 1120 by the optimizer. The desired result of the MNSA 1100 is a determination as to whether it is useful to add statistics to support any of the selection or join predicates of the query, obtained in step 1120, for which statistics are not yet available (denoted $pred_1, \ldots pred_k$).

After a set of predicates without supporting statistics is compiled in step 1140 at least two optimizer-cost estimates are performed in step 1160. $P_{low}$ is the plan in which the unsupported predicates are assigned a selectivity of g, where g is a small positive value. $P_{high}$ is the plan in which the unsupported predicates are assigned a selectivity of 1-g. If all predicates have selectivities between g and 1-g, then $P_{low}$ is the plan with the lowest cost, and $P_{high}$ is the plan with the highest cost. In step 1180, $P_{low}$ and $P_{high}$ are compared to see if they differ by more than a threshold amount t %. If the cost of $P_{low}$ and $P_{high}$ differ by less than t % then due to cost monotonicity, the assumption that the optimizer-estimated cost of an SPJ query is monotonic in the values of the selectivity variables, the cost difference of any pair of plans for any choice of magic numbers between g and 1-g is less than t %. Therefore $P_{low}$ and $P_{high}$ are t-Optimizer-Cost-Equivalent, and hence no additional statistics need to be created and MNSA is complete and the existing statistic set S contains an essential set for the current query. While t-Optimizer-Cost-Equivalence is used in this example, other types of equivalence may be used with MNSA.

The MNSA technique for determining if the existing set of statistics contains an essential set of statistics should be qualified as follows. First, note that even for a single selectivity variable, multiple statistics may be applicable with different degrees of accuracy. Therefore, the choice of selectivity variables without supporting statistics must be extended. Second, for an SPJ query, MNSA guarantees inclusion of an essential set of the query only as long as the selectivity of predicates in the query is between g and 1-g. Therefore it is important to choose a small value for g. A value of g=0.0005 has proven effective. Third, although for SPJ queries MNSA ensures that an essential set is included among the statistics, it is necessary to extend the method beyond simple queries. Aggregation (GROUP BY or SELECT DISTINCT) clauses can be handled by associating a selectivity variable that indicates the fraction of rows in the table with distinct values of the column(s) in the clause. For example, a value of 0.01 for such a selectivity variable for the clause GROUP BY ProductName implies that the number of distinct values of ProductName is 1% of the number of rows in the table. For complex (e.g. multi-block) SQL queries, the basic MNSA strategy is not guaranteed to ensure inclusion of an essential set since the cost-monotonicity assumption may not be true for such queries. However, analyzing relationships among predicates in the query may enable an extension of the applicability of the algorithm. For example, in a case where the cost decreases monotonically with increasing selectivity of the predicate p, a selectivity variable of NOT(p) ensures cost-monotonicity.

The second component of MNSA is called upon if the plans formulated in step 1160 are not equivalent, and it is determined that additional statistics need to be created for the query. The next statistic "s" to construct must be selected using an appropriate technique in step using an appropriate algorithm 1190 and is constructed in step 1195.

Information obtained from the plan of the query may be exploited in step 1190 to decide which of the remaining candidate statistics is most likely to impact query optimization. The plan contains information about individual operators in the plan tree, including the cost of the operator and the statistics that are potentially relevant to that operator. Statistics that are relevant for the most expensive operators in the current query plan are likely to have the most impact on the optimizer. Thus, one way to select the next statistic is to identify the most expensive operator in the plan tree for which one or more candidate statistics have not yet been built and to consider those statistics first. The most expensive operator/node (n) is the one for which the value (Cost(plan subtree rooted at n)–$\Sigma$Cost(Children (n))) is highest. The cost of the subtree plans may be computed using default magic numbers rather than the extremes used in computing $P_{high}$ and $P_{low}$ for a more realistic estimate. Certain statistics may be dependent on one another in the sense that neither statistic is useful in the absence of the other. An example of such dependence is statistics on columns of a join predicate. In such situations, a pair of statistics is created rather than a single statistic. If the same query repeats, then the problem of identifying required statistics for it may be skipped using a technique similar to plan caching used in modern database systems. After the next statistic is created, a new plan P' is formed based on the set of statistics which includes the newly created statistic in step 1197 and P' is then used by the MNSA algorithm due to step 1198 to see if the addition of the new statistic "s" causes the set of statistics S to contain an essential set of statistics and if so, MNSA is terminated.

Magic Number Sensitivity Analysis with Drop

MNSA ensures that given a query (or workload), the existing set of statistics is augmented to include an essential set of statistics for the query (or workload). However, MNSA uses only a sufficiency condition to conclude that statistics need not be created for an essential set. Therefore, despite using MNSA, the building of some non-essential statistics cannot be avoided. A database system that is sensitive to the update cost of statistics requires the ability to drop non-essential statistics.

MNSA may be adapted to detect non-essential statistics at the same time it creates essential statistics. This technique, called Magic Number Sensitivity Analysis with Drop or MNSA/D allows the system to ensure that possible non-essential statistics are detected aggressively as they are created and marked for eventual deletion. MNSA/D thereby interleaves statistics creation with non-essential statistics identification.

Figure 12:
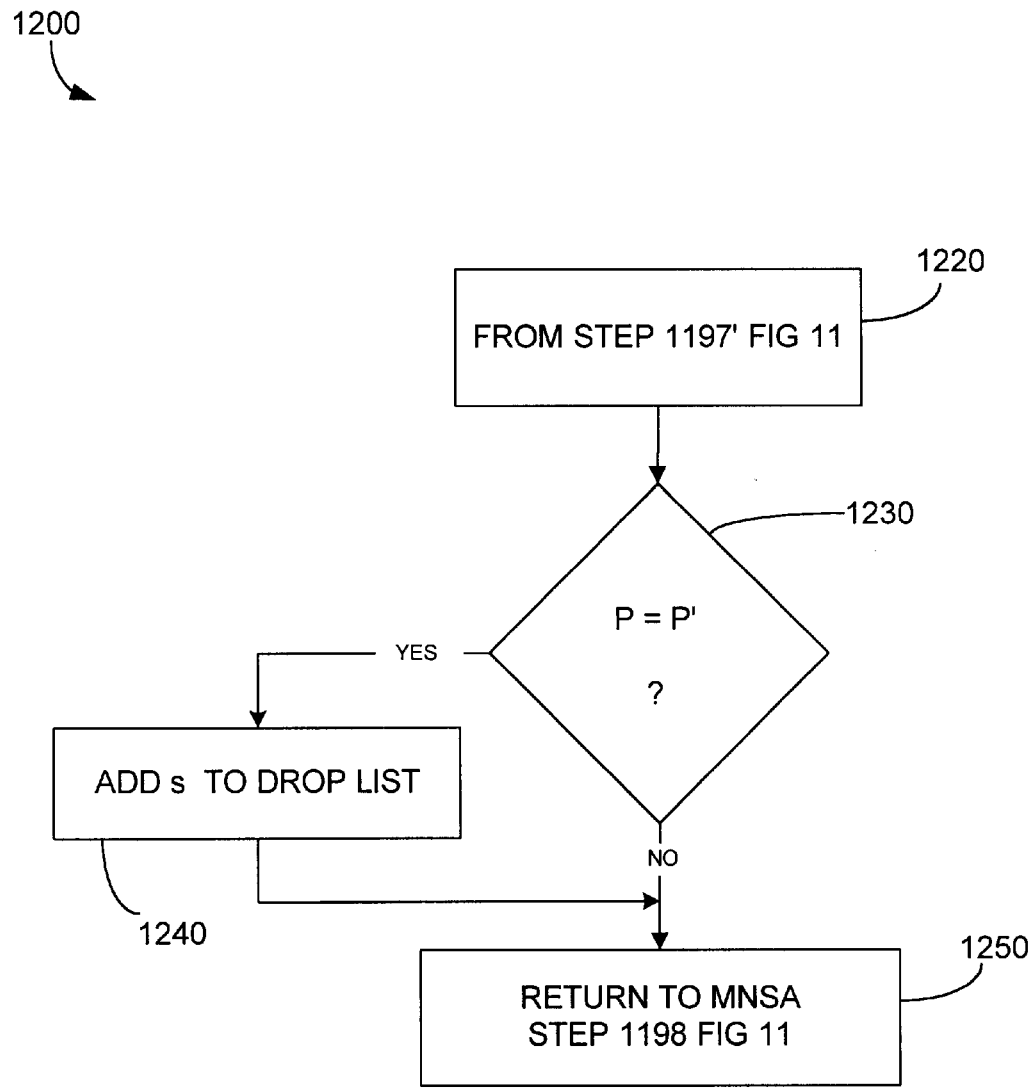
FIG. 12 illustrates a flow chart showing an MNSA having a drop feature.

Referring to FIG. 12, the adaptation of MNSA to include the drop feature is illustrated. The plans P and P' are compared in step 1230. If the plans are equivalent, then the creation of a statistic "s" has no immediate impact on the plan of the query for which it was created, and it is considered a candidate to be dropped and added to a drop list (step 1240). The algorithm then returns to step 1140 of the standard MNSA (FIG. 11) in step 1250. A statistic on the drop list may be dropped when it becomes too expensive to maintain or another drop criteria are met. If a statistic on the drop list is found to be useful for a subsequent query it can be accessed by removing it from the drop fist rather than recreating it.

MNSA/D is a simple adaptation of the MNSA algorithm. If we observe that the creation of the statistic s leaves the plan of the query Q equivalent, then s is heuristically identified as non-essential. The increase in running time of MNSA/D compared to MNSA is negligible since the only overhead is: (a) comparing the plan tree of the query obtained in the current iteration with the plan tree obtained in the previous iteration of MNSA; and (b) maintaining the drop list.

One caveat to using MNSA/D is that it does not guarantee that an essential set remains after the statistics on the drop list have been dropped. For example, the plan for a query Q may be the same for the set of statistics S and S∪{g}, but the plan may be different for S∪{g,h}. In such a case, MNSA/D may drop the statistic g if the statistic g happened to be created first, since plans with S and S∪{g} are the same. MNSA/D cannot also guarantee that all non-essential statistics will be eliminated since once a statistic is included, it may not be considered for dropping as other statistics get created. Nonetheless, in practice MNSA/D eliminates a significant fraction of non-essential statistics and only rarely fails to preserve an essential set while operating at a relatively low cost. To ensure that a essential set is preserved (at the cost of additional running time), the shrinking set algorithm discussed early should be used.

The increase in running time of MNSA/D compared to MNSA is negligible since the only additional work is comparing the plan of the query obtained in the current iteration with the plan obtained in the previous iteration and maintaining the drop list.

Automating Statistics Management

The techniques heretofore described may be utilized to automate statistics management for databases. In one embodiment, an automated database manager may use MNSA to create an initial set of essential statistics and the Shrinking Set algorithm to drop non-essential statistics. A first consideration in implementing this type of automated statistics management system is the level of aggressiveness with which the system ensures that every incoming query has the best possible plan. A second consideration is determining how complete the system should be when identifying non-essential statistics. A third consideration is when the system should check for existence of non-essential statistics.

Figure 13:
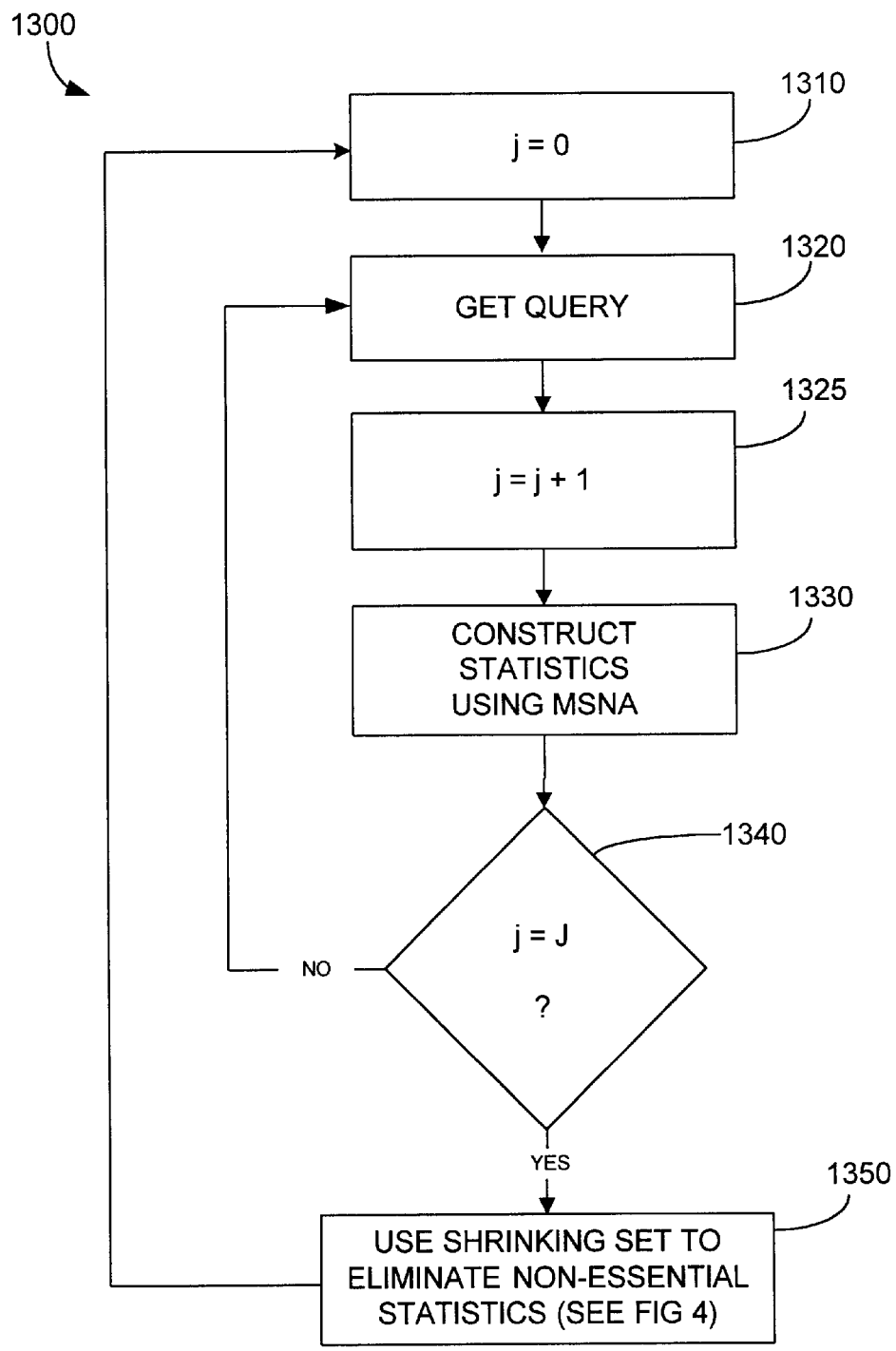
FIG. 13 illustrates a flow diagram for one example of an automated database management technique for identifying an essential set of statistics.

An aggressive policy is to always ensure the best possible execution plan for every incoming query. The flow diagram 1300 of FIG. 13 outlines an automated database technique for implementing this aggressive policy. Microsoft SQL server is an example of such a system. A counter "j" is initialized in step 1310 to control the frequency with which the Shrinking Set algorithm (outlined in FIG. 4 and the accompanying test) is called. In step 1320 an incoming query is obtained for analysis. For each incoming query, the technique creates all syntactically relevant single-column statistics while the database administrator chooses which multi-column statistics are built using MSNA or MSNA/D in step 1330. In step 1340, counter j, which is incremented in step 1325 is checked to see if it is time to call the Shrinking Set algorithm (step 1350) to eliminate accumulated non-essential statistics. For such a system, using MNSA/D can significantly reduce the time spent on creating statistics on-the-fly for the incoming query. Furthermore, if many non-essential statistics accumulate over time, the Shrinking Set algorithm can be used to identify the statistics that can be dropped without affecting the quality of the execution plan of the workload.

Figure 15:
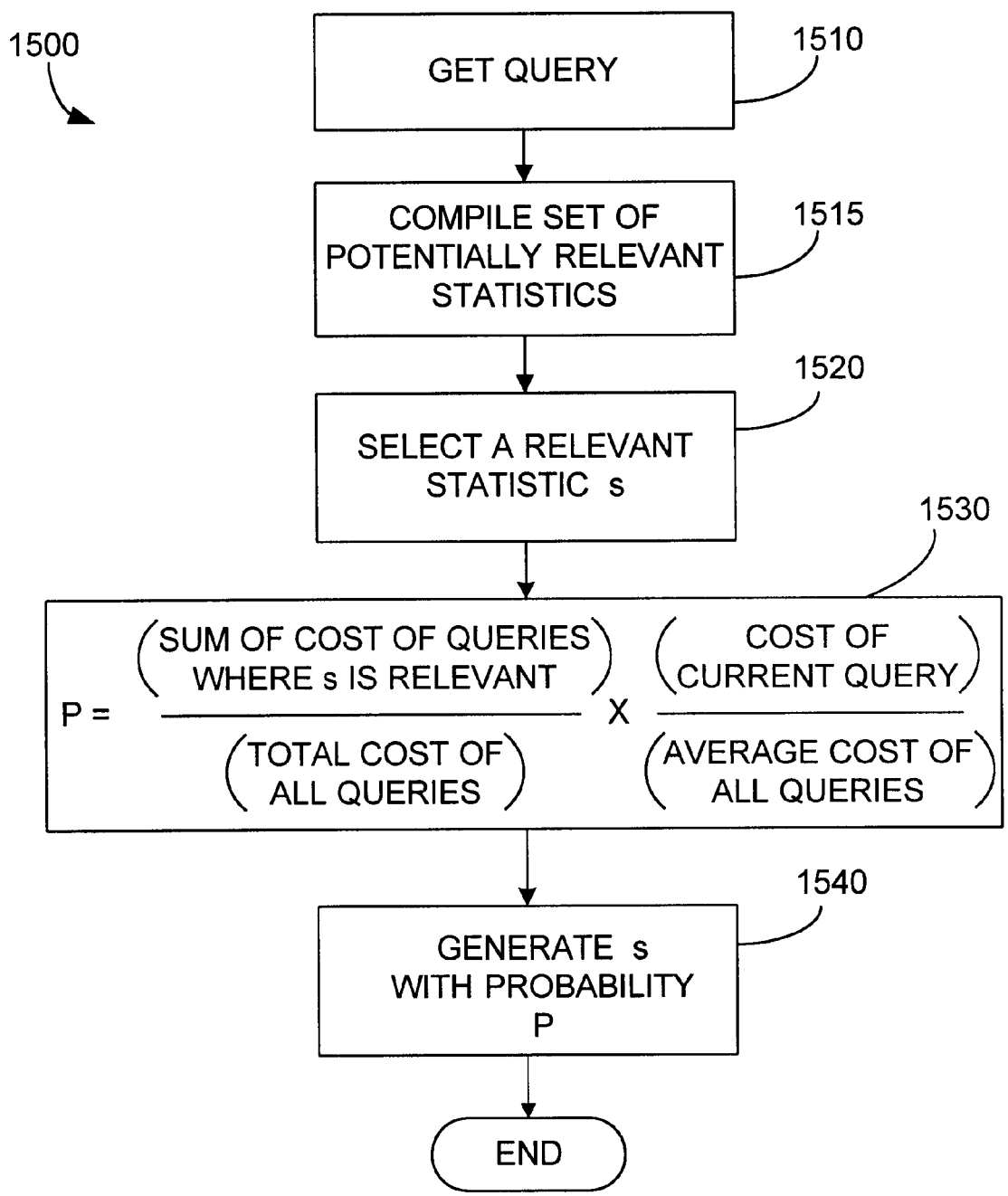
FIG. 15 illustrates a flow diagram for one example of an automated database management technique for identifying an essential set of statistics.

An intermediate approach to automating database management balances the quality of execution plans against the cost of creating and updating statistics. The method outlined in flow diagram 1500 of FIG. 15 includes a mechanism for aging dropped statistics to allow such a trade-off. In general, statistics with high creation/update cost that have been dropped after being determined non-essential for a workload should not be re-created immediately if the same (or similar) workload repeats on the server. In other words, aging "dampens" the process of recreation of recently dropped statistics. However, measures must be taken to ensure that an incoming expensive query that requires one or more dropped statistics is not adversely affected due to aging.

To protect incoming expensive queries, a randomized aging algorithm may be implemented. A query arrives at the server (step 1510) and a set of potentially relevant statistics for the query is compiled in step 1515. A statistic s is selected from this set for creation, perhaps using MNSA, in step 1520. A statistic s is considered a candidate for creation with probability p. If the statistic s is potentially relevant in a large fraction of the workload cost, then it should be assigned a higher probability of creation. In step 1530, probability p is computed for the given statistic "s" as: $p=C*f$, where C=(sum of cost of queries where s is relevant)/(Total cost of all queries) and f=(Cost of current query)/(Average cost of all queries). In an exemplary embodiment, C is assigned a value of 0.10. The statistic is generated in step 1540 with the probability computed in step 1530.

Figure 14:
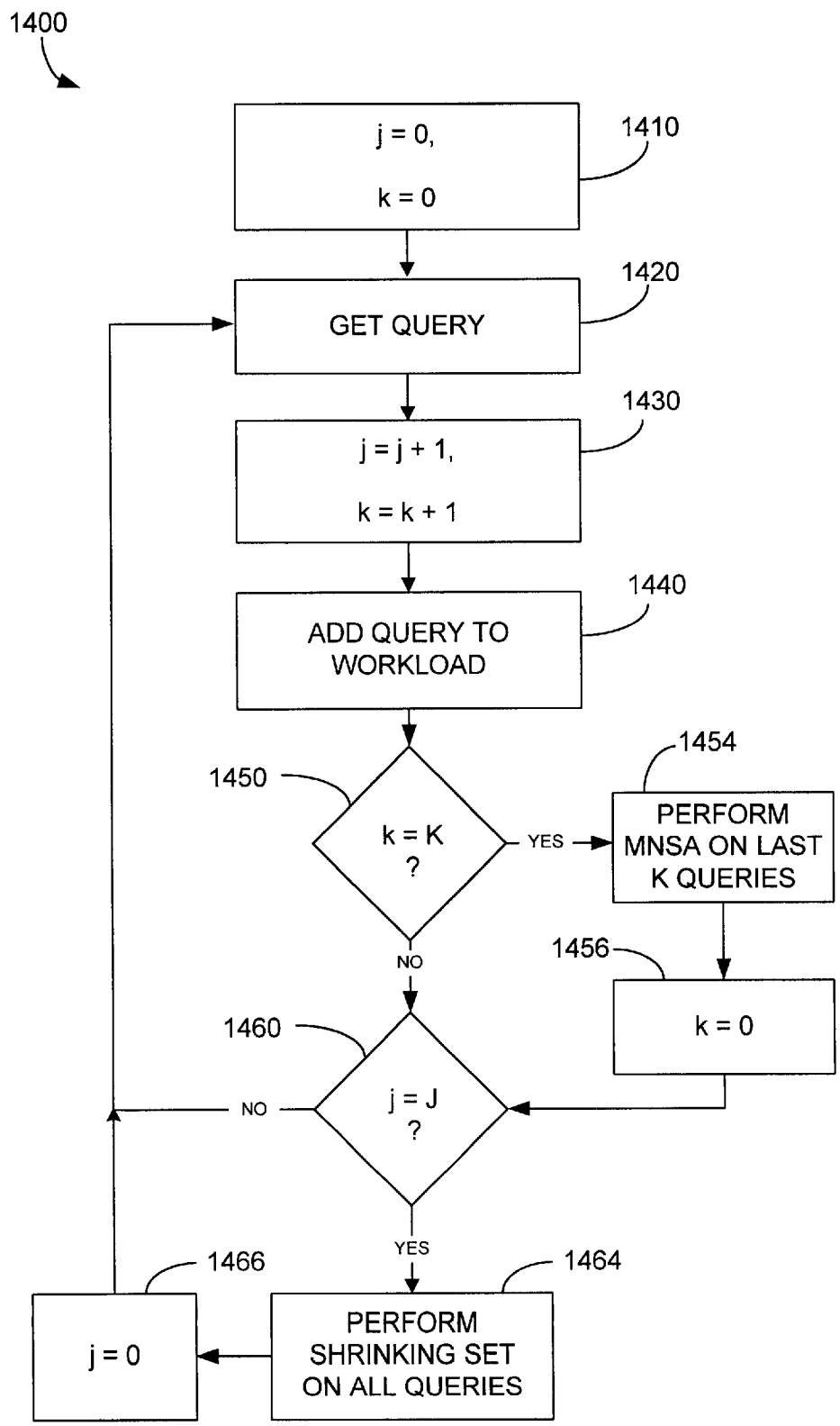
FIG. 14 illustrates a flow diagram for one example of an automated database management technique for identifying an essential set of statistics.

Referring to FIG. 14, flow diagram 1400 illustrates a more conservative approach to automated database management which does not create statistics on-the-fly for incoming queries. Rather the system (or the DBA) periodically initiates an off-line process to determine a set of statistics for the workload, and this set is retained until the next invocation of the off-line process. Counters j and k are initialized in step 1410 and are used to control the frequency with which the Shrinking Set and MSNA are called, respectively. Instead of counters, another signal may be used to control the calling of the methods, such as a timed process. In steps 1420 through 1440 in addition to incrementing the counters j and k, queries are obtained from the server and added to a workload for later analysis. In such an off-line process, MNSA can be used at the proper time (steps 1450 through 1456) to create an initial set for each query in the workload. In step 1456, the counter k is cleared so that next time MNSA is called, it will be performed on k new, unanalyzed queries. The accumulation of statistics by MNSA can be followed the Shrinking Set algorithm at the proper times (steps 1460 through 1466) to eliminate non-essential statistics. In such an off-line process global information may be exploited to optimize statistics creation. For example, MNSA may only consider building statistics that would potentially serve a significant fraction of the workload cost.

The decision of when to physically drop non-essential statistics that have been placed in the drop-list is also a policy issue. Such deletion may be triggered when the cost of maintaining statistics in the drop-list is too high. Statistics may either be dropped individually or together. In one embodiment the server maintains a counter for each table that records the number of rows modified in the table since the last time statistics on the table were updated. When this counter exceeds a specified fraction of the table size, statistics on the table are updated. When a statistic has been updated more than a predetermined number of times, it is physically dropped. It should be noted that in an update sensitive system, even an essential statistic with a high update cost may be dropped.

In the foregoing description, the invention has been described with reference to specific exemplary embodiments thereof It will, however, be evident that various modifications and changes may be made thereto without departing from the broader spirit or scope of the present invention as defined in the appended claims. The specification and drawings are, accordingly, to be regarded in an illustrative rather than a restrictive sense.

We claim:

1. In a database system, a method for determining a set of statistics with respect to a query workload comprising the steps of:
   a) compiling a set of potentially relevant statistics with respect to a query;
   b) calculating a plurality of projected query plans by assigning a variety of predetermined selectivity values to at least one of the potentially relevant statistics, developing an execution plan for each of the selectivity value assignments and evaluating its cost; and
   c) determining a set of statistics based on the plurality of projected query plans.

2. The method of claim 1 wherein the step of calculating a plurality of plans comprises the step of associating a cost with the plan and the step of determining a set of statistics is performed based on the associated cost.

3. The method of claim 1 wherein the step of calculating a plurality of projected query plans is performed by assigning at least two distinct selectivity values between x and 1-x to at least one of the potentially relevant statistics where x is a relatively small number less than 1.0.

4. The method of claim 1 wherein the step of determining a set of statistics is performed by comparing the plurality of projected query plans and determining statistics whose value has a sufficiently small impact on the value of the projected query plans to be non-essential.

5. The method of claim 1 further comprising the step of storing statistics determined to be non-essential for later evaluation.

6. The method of claim 5 wherein the stored non-essential statistics are stored until an elimination criterion is met.

7. The method of claim 6 wherein the elimination criterion is a maximum maintenance cost.

8. In a database system, a method for evaluating the utility of at least one candidate statistic in the estimation of the selectivity of a query, comprising the steps of:
   a) generating a first execution plan based on an existing set of database statistics;
   b) assigning a first selectivity value to the at least one candidate statistic;
   c) determining a first projected query plan by executing the execution plan with the at least one candidate statistic having the first selectivity value;
   d) assigning a second selectivity value to the at least one candidate statistic;
   e) determining a second projected query plan by executing the execution plan with the at least one candidate statistic having the second selectivity value;
   f) comparing the first projected query plan to the second projected query plan; and
   g) assigning a degree of utility to the at least one candidate statistic based on the results of the comparison between the first and second projected query plans.

9. The method of claim 8 wherein the steps of determining a first and second projected query plan comprise the step of assigning an associated cost to each plan and the step of comparing the first and second plans comprises comparing the associated costs of the first and second plans.

10. The method of claim 8 further comprising the step of adding candidate statistics having more than a predetermined degree of utility to a set of statistics maintained by the database system.

11. The method of claim 8 further comprising the step of removing candidate statistics having less than a predetermined degree of utility from a set of statistics maintained by the database system.

12. The method of claim 8 wherein a low degree of utility is assigned to the at least one candidate statistics if the first projected query plan and the second projected query plan are equivalent.

13. The method of claim 8 wherein a high degree of utility is assigned to the at least one candidate statistic if the first projected query plan and the second projected query plan are not equivalent.

14. The method of claim 8 further comprising the steps of:
   a) adding a statistic having a requisite degree of utility to the existing set of database statistics to form an updated set of statistics;
   b) generating a second execution plan based on the updated set of database statistics;
   c) comparing the first execution plan to the second execution plan; and
   d) adding the statistic having the requisite degree of utility to set of statistics to be dropped if the first and second execution plans are equivalent.

15. The method of claim 14 wherein statistics within the set of statistics to be dropped are maintained until a predetermined elimination criterion has been met.

16. The method of claim 15 wherein the elimination criteria is a maximum cost of maintenance.

17. In a database system, a method for determining a set of statistics with respect to a query workload comprising the steps of:
   a) compiling a set of potentially relevant statistics for a user query comprising a plurality of operators;
   b) determining which potentially relevant statistics have not yet been constructed by the database system;
   c) assigning a first selectivity value to the unconstructed statistics;
   d) computing a first projected query plan for the query wherein the unconstructed statistics have the first value;
   e) assigning a second selectivity value to the unconstructed statistics;
   f) computing a second projected query plan for the query wherein the unconstructed statistics have the second value;
   g) comparing the first and second projected query plans;
   h) discontinuing the determination of a set of statistics if the first and second projected query plans are equivalent;
   i) selecting an unconstructed statistic to build if the first and second projected query plans are not equivalent;
   j) building the unconstructed statistic selected in step (i); and
   k) repeating steps (b) through (j) until the first and projected query plans are equivalent or all the unconstructed potentially relevant statistics compiled in step (a) have been constructed.

18. The method of claim 17 wherein the step of selecting an unconstructed statistic to build is performed by selecting an unconstructed statistic that is relevant for at least one relatively expensive operator in the query.

19. The method of claim 17 wherein the steps of computing first and second projected query plan comprise associating a cost with each plan and the steps (h), (i), and (k) are performed based on the costs associated with each plan.

20. In a database system, a method for providing automated database statistics management for creating and maintaining a set of essential statistics with respect to a query workload comprising the steps of:
    a) creating an initial set of statistics by
        i) compiling a set of potentially relevant statistics with respect to a query;
        ii) calculating a plurality of projected query plans by assigning a variety of predetermined selectivity values to at least one of the potentially relevant statistics, developing an execution plan for each of the selectivity value assignments and evaluating its cost; and
        iii) determining a set of statistics based on the plurality of projected query plans;
    b) eliminating any non-essential statistics by
        i) identifying a subset of the initial set of statistics equivalent to the initial set of statistics with respect to each query, wherein the subset of statistics is equivalent to the initial set of statistics:
            A) if an execution plan for each query using the subset of statistics is the same as an execution plan for that query using the initial set of statistics, and/or
            B) if a cost estimate to execute each query against the database using the subset of statistics is within a predetermined amount of a cost estimate to execute that query against the database using the initial set of statistics.

21. The method of claim 20 wherein step (a) is performed in real time after each query in the query workload.

22. The method of claim 20 wherein the query workload comprises a plurality of previously executed queries and steps (a) and (b) are performed off-line on the query workload.

23. The method of claim 20 wherein step of creating an initial set of statistics is performed by assigning a probability of creation to a statistic based on the proportional amount of the query workload to which it is potentially relevant.

24. The method claim 20 wherein the step of calculating a plurality of projected query plans comprises associating a cost with each plan and the set of statistics is determined based on the cost associated with each plan.

25. A computer readable medium having computer-executable instructions for determining a set of statistics with respect to a query workload comprising the steps of:
    a) compiling a set of potentially relevant statistics with respect to a query,
    b) calculating a plurality of projected query plans by assigning a variety of predetermined selectivity values to at least one of the potentially relevant statistics, developing an execution plan for each of the selectivity value assignments and evaluating its cost; and
    c) determning a set of statistics based on the plurality of projected query plans.

26. The computer readable medium of claim 25 wherein the step of calculating a plurality of plans comprises the step of associating a cost to the plan and the step of determining a set of statistics is performed based on the associated cost.

27. The computer readable medium of claim 25 wherein the step of calculating a plurality of projected query plans is performed by assigning at least two distinct values between x and 1-x where x is a relatively small number less than 1.0 to at least one of the potentially relevant statistics.

28. The computer readable medium of claim 25 wherein the step of determining a set of statistics is performed by comparing the plurality of projected query plans and determining statistics whose value have a sufficiently small impact on the value of the projected query plans to be non-essential.

29. The computer readable medium of claim 25 further comprising the step of storing statistics determined to be non-essential for later evaluation.

30. The computer readable medium of claim 29 wherein the stored non-essential statistics are stored until an elimination criterion is met.

31. The computer readable medium of claim 30 wherein the elimination criterion is a maximum maintenance cost.

32. A computer readable medium having computer-executable instructions for evaluating the utility of at least one candidate statistic in the estimation of the selectivity of a query, comprising the steps of:
    a) generating a first execution plan including the at least one candidate;
    b) assigning a first selectivity value to the at least one candidate statistic;
    c) determining a first projected query plan by executing the execution plan with the at least one candidate statistic having the first selectivity value;
    d) assigning a second selectivity value to the at least one candidate statistic;
    e) determining a second projected query plan by executing the execution plan with the at least one candidate statistic having the second selectivity value;
    f) comparing the first projected query plan to the second projected query plan; and
    g) assigning a degree of utility to the at least one candidate statistic based on the results of the comparison between the first and second projected query plans.

33. The computer readable medium of claim 32 wherein the steps of determining a first and second projected query plan comprise the step of assigning an associated cost to each plan and the step of comparing the first and second plans comprises comparing the associated costs of the first and second plans.

34. The computer readable medium of claim 32 further comprising the step of adding candidate statistics having more than a predetermined degree of utility to a set of statistics maintained by the database system.

35. The computer readable medium of claim 32 further comprising the step of removing candidate statistics having less than a predetermined degree of utility from a set of statistics maintained by the database system.

36. The computer readable medium of claim 32 wherein a low degree of utility is assigned to the at least one candidate statistics if the first projected query plan and the second projected query plan are equivalent.

37. The computer readable medium of claim 32 wherein a high degree of utility is assigned to the at least one candidate statistic if the first projected query plan and the second projected query plan are not equivalent.

38. The computer readable medium of claim 32 further comprising the steps of:
    a) adding a statistic having a requisite degree of utility to the existing set of database statistics to form an updated set of statistics;
    b) generating a second execution plan based on the updated set of database statistics;
    c) comparing the first execution plan to the second execution plan; and
    d) adding the statistic having the requisite degree of utility to set of statistics to be dropped if the first and second execution plans are equivalent.

39. The computer readable medium of claim 34 wherein statistics within the set of statistics to be dropped are maintained until a predetermined elimination criterion has been met.

40. The computer readable medium of claim 39 wherein the elimination criteria is a maximum cost of maintenance.

41. A computer readable medium having computer-executable instructions for determining a set of statistics with respect to a query workload comprising the steps of:
 a) compiling a set of potentially relevant statistics for a user query comprising a plurality of operators;
 b) determining which potentially relevant statistics have not yet been constructed by the database system;
 c) assigning a first selectivity value to the unconstructed statistics;
 d) computing a first projected query plan for the query wherein the unconstructed statistics have the first value;
 e) assigning a second selectivity value to the unconstructed statistics;
 f) computing a second projected query plan for the query wherein the unconstructed statistics have the second value;
 g) comparing the first and second projected query plans;
 h) discontinuing the determination of a set of statistics if the first and second projected query plans are equivalent;
 i) selecting an unconstructed statistic to build if the first and second projected query plans are not equivalent;
 j) building the unconstructed statistic selected in step (i); and
 k) repeating steps (b) through (j) until the first and projected query plans are similar to within the threshold amount or all the unconstructed potentially relevant statistics compiled in step (a) have been constructed.

42. The computer readable medium of claim 41 wherein the step of selecting an unconstructed statistic to build is performed by selecting an unconstructed statistic that is relevant for at least one relatively expensive operator in the query.

43. The computer readable medium of claim 41 wherein the steps of computing first and second projected query plan comprise associating a cost with each plan and the steps (h), (i), and (k) are performed based on the costs associated with each plan.

44. A computer readable medium having computer-executable instructions for providing automated database statistics management for creating and maintaining a set of essential statistics with respect to a query workload comprising the steps of:
 a) creating an initial set of statistics by
  i) compiling a set of potentially relevant statistics with respect to a query;
  ii) calculating a plurality of projected query plans by assigning a variety of selectivity values to at least one of the potentially relevant statistics, developing an execution plan for each of the selectivity value assignments and evaluating its cost; and
  iii) determining a set of statistics based on the plurality of projected query plans; and
 b) eliminating any non-essential statistics by
  i) identifying a subset of the initial set of statistics equivalent to the initial set of statistics with respect to each query, wherein the subset of statistics is equivalent to the initial set of statistics:
   A) if an execution plan for each query using the subset of statistics is the same as an execution plan for that query using the initial set of statistics, and/or
   B) if a cost estimate to execute each query against the database using the subset of statistics is within a predetermined amount of a cost estimate to execute that query against the database using the initial set of statistics.

45. The computer readable medium of claim 44 wherein step (a) is performed in real time after each query in the query workload.

46. The computer readable medium of claim 44 wherein the query workload comprises a plurality of previously executed queries and steps (a) and (b) are performed off-line on the query workload.

47. The computer readable medium of claim 44 wherein step of creating an initial set of statistics is performed by assigning a probability of creation to a statistic based on the proportional amount of the query workload to which it is potentially relevant.

48. The computer readable medium of claim 44 wherein the step of calculating a plurality of projected query plans comprises associating a cost with each plan and the set of statistics is determined based on the cost associated with each plan.

49. In a database system, an apparatus for determining a set of statistics with respect to a query workload comprising:
 a) means for compiling a set of potentially relevant statistics with respect to a query;
 b) means for calculating a plurality of projected query plans by assigning a variety of predetermined selectivity values to at least one of the potentially relevant statistics, developing an execution plan for each of the selectivity value assignments and evaluating its cost; and
 c) means for determining a set of statistics based on the plurality of projected query plans.

50. The apparatus of claim 49 wherein the means for calculating a plurality of plans comprises a means for associating a cost to the plan and the means for determining a set of statistics bases the determination on the associated cost.

51. The apparatus of claim 49 wherein the means for calculating a plurality of projected query costs assigns at least distinct values between x and 1-x where x is a relatively small number less than 1.0 to at least one of the potentially relevant statistics.

52. The apparatus of claim 49 wherein the means for determining a set of statistics compares the plurality of projected query plans and determines statistics whose value has a sufficiently small impact on the value of projected query plans to be non-essential.

53. The apparatus of claim 49 further comprising means for storing statistics determined to be non-essential for later evaluation.

54. The apparatus of claim 53 wherein the means for storing non-essential statistics stores the non-essential statistics until an elimination criterion is met.

55. The apparatus of claim 54 wherein the elimination criterion is a maximum maintenance cost.

56. In a database system, an apparatus for evaluating the utility of at least one candidate statistic in the estimation of the selectivity of a query, comprising:
 a) means for generating an execution based on an existing set of database statistics;
 b) means for assigning a first selectivity value to the at least one candidate statistic;
 c) means for determining a first projected query plan by executing the estimation plan with the at least one candidate statistic having the first value;

d) means for assigning a second selectivity value to the at least one candidate statistic;
e) means for determining a second projected query plan by executing the estimation plan with the at least one candidate statistic having the second selectivity value;
f) means for comparing the first projected query plan to the second projected query plan; and
g) means for assigning a degree of utility to the at least one candidate statistic based on the results of the comparison between the first and projected query plans.

57. The apparatus of claim 56 wherein the means for determining the first and second projected query plans assigns an associated cost to each plan and the means for comparing the first and second query plans compares the associated costs of the first and second plans.

58. The apparatus of claim 56 further comprising means for adding candidate statistics having more than a predetermined degree of utility to a set of statistics maintained by the database system.

59. The apparatus of claim 56 further comprising means for removing candidate statistics having less than a predetermined degree of utility from a set of statistics maintained by the database system.

60. The apparatus of claim 56 wherein a low degree of utility is assigned to the at least one candidate statistics if the first projected query plan and the second projected query plan are equivalent.

61. The apparatus of claim 56 wherein a high degree of utility is assigned to the at least one candidate statistic if the first projected query plan and the second projected query plan are not equivalent.

62. The apparatus of claim 56 further comprising:
a) means for adding a statistic having a requisite degree of utility to the existing set of database statistics to form an updated set of statistics;
b) means for generating a second execution plan based on the updated set of database statistics;
c) means for comparing the first execution plan to the second execution plan; and
d) means for adding the statistic having the requisite degree of utility to set of statistics to be dropped if the first and second execution plans are equivalent.

63. The apparatus of claim 62 wherein within the set of statistics to be dropped are maintained until a predetermined elimination criterion has been met.

64. The method of claim 63 wherein the elimination criteria is a maximum cost of maintenance.

65. In a database system, an apparatus for determining a set of statistics with respect to a query workload comprising:
a) means for compiling a set of potentially relevant statistics for a user query comprising a plurality of operators;
b) means for determining which potentially relevant statistics have not yet been constructed by the database system;
c) means for assigning a first selectivity value to the unconstructed statistics;
d) means for computing a first projected query plan for the query wherein the unconstructed statistics have the first selectivity value;
e) means for assigning a second selectivity value to the unconstructed statistics;
f) means for computing a second projected query plan for the query wherein the unconstructed statistics have the second selectivity value;
g) means for comparing the first and second projected query plans;
h) means for discontinuing the determination of a set of statistics if the first and second projected query plans are equivalent;
i) means for selecting an unconstructed statistic to build if the first and second projected query plans are not equivalent;
j) means for building the unconstructed statistic selected in step (i); and
k) means for repeating steps (b) through (j) until the first and second projected query plans are equivalent or all the unconstructed potentially relevant statistics compiled in step (a) have been constructed.

66. The apparatus of claim 65 wherein the means for selecting an unconstructed statistic to build selects an unconstructed statistic that is relevant for at least one relatively expensive operator in the query.

67. The apparatus of claim 65 wherein the means for computing first and second projected query plans associates a cost with each plan and the means of (h), (i), and (k) use the associated costs.

68. In a database system, an apparatus for providing automated database statistics management for creating and maintaining a set of essential statistics with respect to a query workload comprising:
a) means for creating an initial set of statistics by
 i) means for compiling a set of potentially relevant statistics with respect to a query;
 ii) means for calculating a plurality of projected query plans by assigning a variety of selectivity values to at least one of the potentially relevant statistics, developing an execution plan for each of the selectivity value assignments and evaluating its cost; and
 iii) means for determining a set of statistics based on the plurality of projected query plans; and
b) means for eliminating any non-essential statistics by
 i) identifying a subset of the initial set of statistics equivalent to the initial set of statistics with respect to each query, wherein the subset of statistics is equivalent to the initial set of statistics:
  A) if an execution plan for each query using the subset of statistics is the same as an execution plan for that query using the initial set of statistics, and/or
  B) if a cost estimate to execute each query against the database using the subset of statistics is within a predetermined amount of a cost estimate to execute that query against the database using the initial set of statistics.

69. The apparatus of claim 68 wherein the means for creating an initial set of statistics is activated in real time after each query in the query workload.

70. The apparatus of claim 68 wherein the query workload comprises a plurality of previously executed queries and the means for creating an initial set of statistics and the means for eliminating non-essential statistics are activated off-line on the query workload.

71. The apparatus of claim 68 wherein the means for creating an initial set of statistics assigns a probability of creation to a statistic based on the proportional amount of the query workload to which it is potentially relevant.

72. The apparatus of claim 68 wherein the means for calculating a plurality of projected query plans associates a cost with each plan and the means for determining a set of statistics uses the costs associated with each plan to determine the set of statistics.

\* \* \* \* \*